(12) United States Patent
Raeis Hosseiny et al.

(10) Patent No.: US 11,787,336 B2
(45) Date of Patent: Oct. 17, 2023

(54) TRAILER HITCHING ASSISTANCE SYSTEM INCLUDING TRAILER TYPE IDENTIFICATION AND ADAPTIVE INTERFACE

(71) Applicant: Ford Global Technologies, LLC, Dearborn, MI (US)

(72) Inventors: Seyed Armin Raeis Hosseiny, Canton, MI (US); Bo Bao, Bloomfield, MI (US); Luke Niewiadomski, Dearborn, MI (US); Roger Arnold Trombley, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 141 days.

(21) Appl. No.: 17/361,555

(22) Filed: Jun. 29, 2021

(65) Prior Publication Data

US 2022/0410804 A1    Dec. 29, 2022

(51) Int. Cl.
| | |
|---|---|
| *B60D 1/36* | (2006.01) |
| *B60R 11/04* | (2006.01) |
| *B62D 53/08* | (2006.01) |
| *B60R 1/00* | (2022.01) |
| *B60D 1/06* | (2006.01) |
| *B60R 11/00* | (2006.01) |

(52) U.S. Cl.
CPC .................. *B60R 1/00* (2013.01); *B60D 1/06* (2013.01); *B60D 1/36* (2013.01); *B60R 11/04* (2013.01); *B62D 53/0842* (2013.01); *B60R 2011/004* (2013.01); *B60R 2300/808* (2013.01)

(58) Field of Classification Search
CPC .................................. B60R 1/00; B60R 1/06
See application file for complete search history.

(56) References Cited

U.S. PATENT DOCUMENTS

| | | | |
|---|---|---|---|
| 5,901,426 A | 5/1999 | Okazaki et al. | |
| 6,769,709 B1 | 8/2004 | Piper et al. | |
| 6,900,724 B2 | 5/2005 | Johnson | |
| 7,793,968 B1 * | 9/2010 | Withers | B60D 1/485 280/425.2 |
| 8,976,246 B1 | 3/2015 | Rappuhn | |

(Continued)

FOREIGN PATENT DOCUMENTS

| | | |
|---|---|---|
| CN | 1991311 A | 7/2007 |
| DE | 102012001380 A1 | 8/2012 |

(Continued)

*Primary Examiner* — Irfan Habib
(74) *Attorney, Agent, or Firm* — Frank Lollo; Price Heneveld LLP

(57) ABSTRACT

A system for assisting in aligning a vehicle for hitching with a trailer includes a first camera and a second camera and outputting image data to the rear of the vehicle and a controller identifying at least one of the trailer or a coupling feature of the trailer within the image data and assigning a trailer type to the trailer identified within the image data, the trailer type including a first trailer type and a second trailer type. The controller further causes a portion of the image data to be presented on a display within the vehicle, the portion of the image data corresponding with the first camera in response to the trailer being assigned the first trailer type and corresponding with the second camera in response to the trailer being assigned the second trailer type.

19 Claims, 14 Drawing Sheets

(56) References Cited

U.S. PATENT DOCUMENTS

| | | |
|---|---|---|
| 9,102,271 B2 | 8/2015 | Trombley et al. |
| 9,264,672 B2 | 2/2016 | Lynam |
| 9,346,396 B2 | 5/2016 | Nave et al. |
| 9,403,413 B2 | 8/2016 | Talty et al. |
| 9,464,886 B2 | 10/2016 | Salter et al. |
| 9,696,723 B2 | 7/2017 | Zeng et al. |
| 9,821,845 B2 | 11/2017 | Xu et al. |
| 9,834,140 B2 | 12/2017 | Windeler |
| 9,854,209 B2 | 12/2017 | Aich et al. |
| 9,868,422 B2 * | 1/2018 | Lee .................. B60T 13/662 |
| 10,532,698 B2 * | 1/2020 | Potnis .................. G06N 3/08 |
| 10,829,046 B2 * | 11/2020 | Nagasamy ............ G06N 20/00 |
| 10,870,323 B2 | 12/2020 | Niewiadomski et al. |
| 11,077,795 B2 * | 8/2021 | Jales Costa ........... G06T 3/4046 |
| 11,505,124 B2 * | 11/2022 | Niewiadomski ..... G05D 1/0231 |
| 2002/0100175 A1 | 8/2002 | King |
| 2005/0074143 A1 | 4/2005 | Kawai |
| 2007/0216136 A1 | 9/2007 | Dietz |
| 2010/0265048 A1 * | 10/2010 | Lu ......................... B60R 1/002 |
| | | 340/435 |
| 2012/0162427 A1 | 6/2012 | Lynam |
| 2014/0160276 A1 * | 6/2014 | Pliefke .................. B62D 13/06 |
| | | 348/118 |
| 2014/0200759 A1 * | 7/2014 | Lu .......................... G06T 7/246 |
| | | 701/28 |
| 2014/0218506 A1 | 8/2014 | Trombley et al. |
| 2015/0115571 A1 | 4/2015 | Zhang et al. |
| 2016/0023601 A1 | 1/2016 | Windeler |
| 2016/0052548 A1 | 2/2016 | Singh et al. |
| 2016/0375831 A1 | 12/2016 | Wang et al. |
| 2017/0136837 A1 * | 5/2017 | Merino Almeida ....... B60J 5/12 |
| 2017/0136838 A1 * | 5/2017 | Merino Almeida ..... B60D 1/56 |
| 2020/0130744 A1 | 4/2020 | Niewiadomski et al. |
| 2021/0129752 A1 | 5/2021 | Raeis Hosseiny et al. |
| 2022/0001897 A1 * | 1/2022 | Vasoya .................. G06V 10/82 |

FOREIGN PATENT DOCUMENTS

| | | |
|---|---|---|
| EP | 2682329 B1 | 3/2018 |
| EP | 2988973 B1 | 7/2018 |

* cited by examiner

TRAILER HITCHING ASSISTANCE SYSTEM INCLUDING TRAILER TYPE IDENTIFICATION AND ADAPTIVE INTERFACE

FIELD OF THE DISCLOSURE

The present disclosure generally relates to a vehicle hitch assistance system. In particular, the system provides a camera view selected to correspond with an identified trailer type during an alignment phase.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE DISCLOSURE

According to a first aspect of the present disclosure, a system for assisting in aligning a vehicle for hitching with a trailer includes an imaging system including a first camera and a second camera and capturing image data of an area to the rear of the vehicle and outputting the image data and a controller identifying at least one of the trailer or a coupling feature of the trailer within the image data and assigning a trailer type to the trailer identified within the image data, the trailer type including a first trailer type and a second trailer type. The controller further causes a portion of the image data to be presented on a display within the vehicle, the portion of the image data corresponding with the first camera in response to the trailer being assigned the first trailer type and corresponding with the second camera in response to the trailer being assigned the second trailer type, presents a target image over the portion of the image data presented on the display, the target image being smaller than a field of view associated with the portion of the image data and corresponding with a target position area relative to the vehicle, and determines that the at least one of the coupling feature and the trailer is within the target position area and outputting a steering signal to the vehicle to cause the vehicle to steer to align a hitch of the vehicle with the coupling feature.

Embodiments of the first aspect of the disclosure can include any one or a combination of the following features:

the vehicle defines a rear portion and a cabin having a rear edge forward of the rear portion of the vehicle, the first camera is mounted on the rear portion of the vehicle, and the second camera is mounted adjacent the rear edge of the cabin;

the vehicle is a pickup truck, the rear portion of the vehicle includes a tailgate of the pickup truck, the tailgate enclosing an end of a bed of the pickup truck, and the rear edge of the cabin is defined above a rear cab window of the pickup truck such that the field of view associated with the portion of the image data corresponding with the second camera includes at least a portion of the bed of the pickup truck;

the first trailer type is a conventional trailer configured for coupling with the vehicle at a hitch disposed on a rear of the vehicle, and the second trailer type is a fifth-wheel trailer configured for coupling with the vehicle at a kingpin disposed over a rear axle of the vehicle;

the target image is presented to include a depiction of a conventional trailer when the assigned trailer type is the conventional trailer, and the target image is presented to include a depiction of a fifth-wheel trailer when the assigned trailer type is the fifth-wheel trailer;

when the assigned trailer type is the fifth-wheel trailer, the controller further configures the target position area to be disposed from a front of the trailer, and the controller further outputs an instruction for movement of the vehicle determined to position the one of the trailer or the coupling feature within the target position area; and causing the portion of the image data corresponding with the second camera to be presented on the display within the vehicle includes applying a digital scaling function to the portion of the image data.

According to another aspect of the present disclosure, a system for assisting in aligning a vehicle for hitching with a trailer includes an imaging system outputting image data to the rear of the vehicle and a controller causing a portion of the image data to be presented on a display within the vehicle and identifying at least one of the trailer or a coupling feature of the trailer within the image data, assigning a trailer type to the trailer identified within the image data, the trailer type including a first trailer type and a second trailer type, presenting a target image over the portion of the image data presented on the display, the target image being smaller than a field of view associated with the portion of the image data, corresponding with a target position area relative to the vehicle, and including a depiction of the trailer type, and determining that the at least one of the coupling feature and the trailer is within the target position and outputting a steering signal to the vehicle to cause the vehicle to steer to align a hitch of the vehicle with the coupling feature.

According to another aspect of the present disclosure, a system for assisting in aligning a vehicle for hitching with a trailer includes an imaging system outputting image data of a field of view to the rear of the vehicle and a controller identifying at least one of the trailer or a coupling feature of the trailer within the image data, determining that the at least one of the trailer or the coupling feature is outside of a target position area relative to the vehicle and outputting an instruction for movement of the vehicle determined to position the one of the trailer or the coupling feature within the target position area in response to identifying at least one characteristic indicating a user difficulty in positioning the one of the trailer or the coupling feature within the target position area, determining that the at least one of the coupling feature and the trailer is within the target position area and outputting a steering signal to the vehicle to cause the vehicle to steer to align a hitch of the vehicle with the coupling feature.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
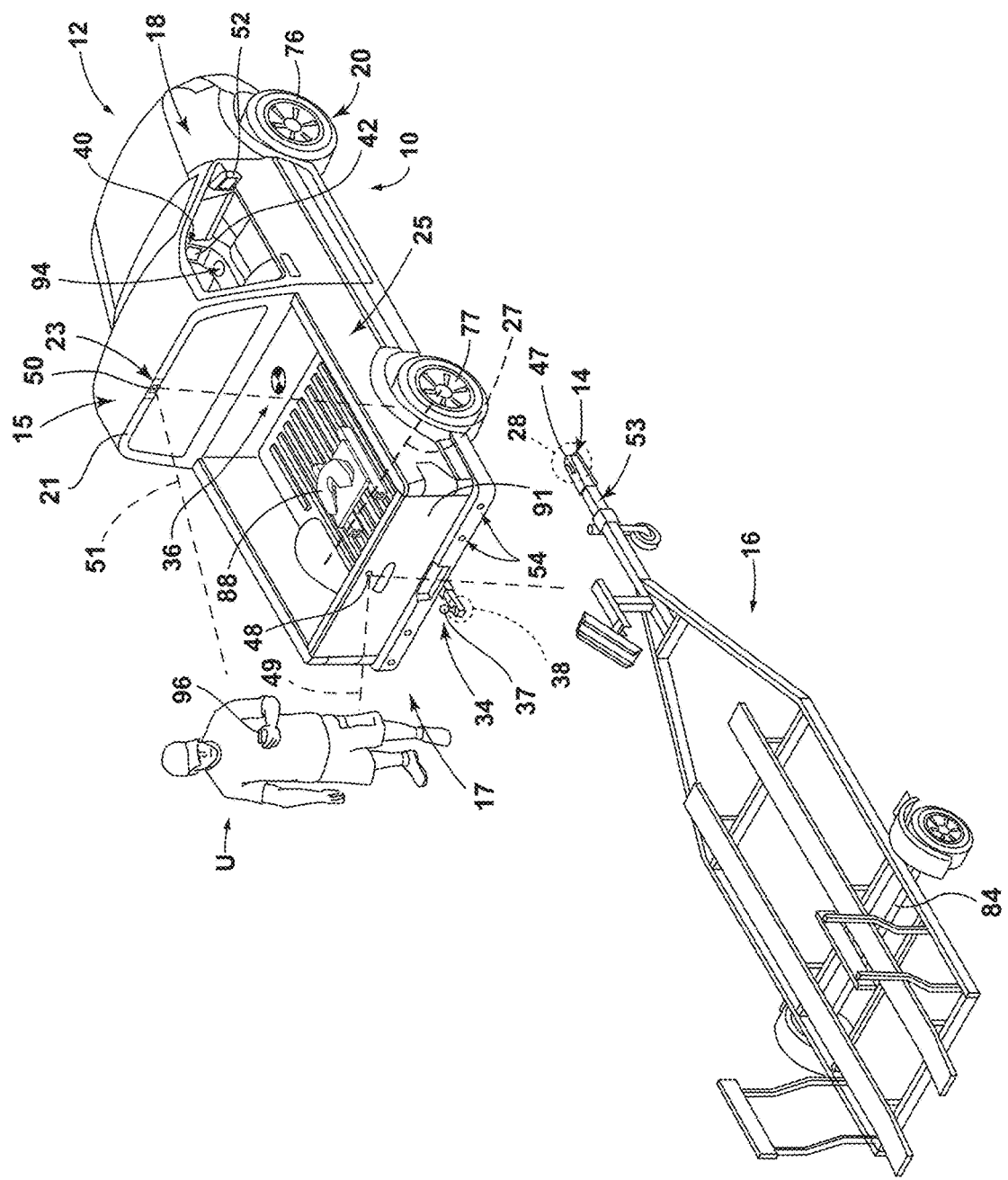
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-16, reference number 10 generally refers to a system for assisting in aligning a vehicle 12 for hitching with a trailer 16. System 10 includes an imaging system 18 including a first camera 48 and a second camera 50 and outputting image data 55 to the rear 17 of the vehicle 12 and a controller 26 identifying at least one of the trailer 16 or a coupling feature 14 of the trailer 16 within the image data 55 and assigning a trailer type to the trailer 16 identified within the image data 55, the trailer type including a first trailer type and a second trailer type. The controller 26 further causes a portion of the image data 55 to be presented on a display 44 within the vehicle 12, the portion of the image data 55 corresponding with the first camera 48 in response to the trailer 16 being assigned the first trailer type and corresponding with the second camera 50 in response to the trailer 16 being assigned the second trailer type, presents a target image 45 over the portion of the image data 55 presented on the display 44, the target image 45 being smaller than a field of view 49 or 51 associated with the portion of the image data 55 and corresponding with a target position area 110 relative to the vehicle 12, and determines that the at least one of the coupling feature 14 and the trailer 16 is within the target position are 110 and outputs a steering signal 69 to the vehicle 12 to cause the vehicle 12 to steer to align a hitch 37 of the vehicle 12 with the coupling feature 14.

Referring generally to FIG. 1, the vehicle 12 is shown in the form of a pickup truck that includes a vehicle cabin 15 in the form of a forward "cab" that can have a number of different implementation (standard, two-door with front seats only; an "extended" cab with small rear seats and, optionally a rear-hinged rear door; a "crew" cab including a larger rear seat and four doors; etc.) having a substantially vertical rear windshield 19 at the rear of the cabin 15. Along a rear edge 21 of the cabin 15 there may be disposed a rear brake light, which may be referred to as a center high-mount stop light ("CHMSL") 23 that may also house auxiliary lighting (e.g. for illumination of the bed 25 of the truck), disposed behind the cabin 15. The bed 25 extends rearward from the cabin 15 to a rear 17 of the vehicle 12 such that the bed 25 extends beyond and over a rear axle 27 of the vehicle 12. In the illustrated example, the above-mentioned hitch 34 is in the form of a hitch ball 37 connected with the frame of the vehicle 12 by a ball mount 39 that extends rearward below and past the rear bumper 41 of the vehicle 12. For connection with the hitch ball 37 type hitch 34 of the present example, the trailer 16 is configured as a "standard" trailer with a coupling feature 14 in the form of a cup 47 mounted on the end of a tongue 53 of the trailer 16 that extends forward of the axle 84 of the trailer 16. The present example depicts an A-frame trailer configured for transporting a boat or the like, with other standard trailer configurations being known, including box trailers, and the like. As discussed further below, in one implementation the present system 10 can operate to control reversing of the vehicle 12 to align (both longitudinally and laterally) the hitch ball 37 beneath the cup 47 such that the trailer tongue 53 can be lowered to position the cup 47 over and around the hitch ball 37 for coupling of the trailer 16 to the vehicle 12 (including by operation of an additional latch or other securement mechanism to help ensure that the cup 47 is maintained in the coupled relationship with the hitch ball 37 and the attachment of a chain(s) between the trailer 16 and the base of the ball mount 39).

Figure 2:
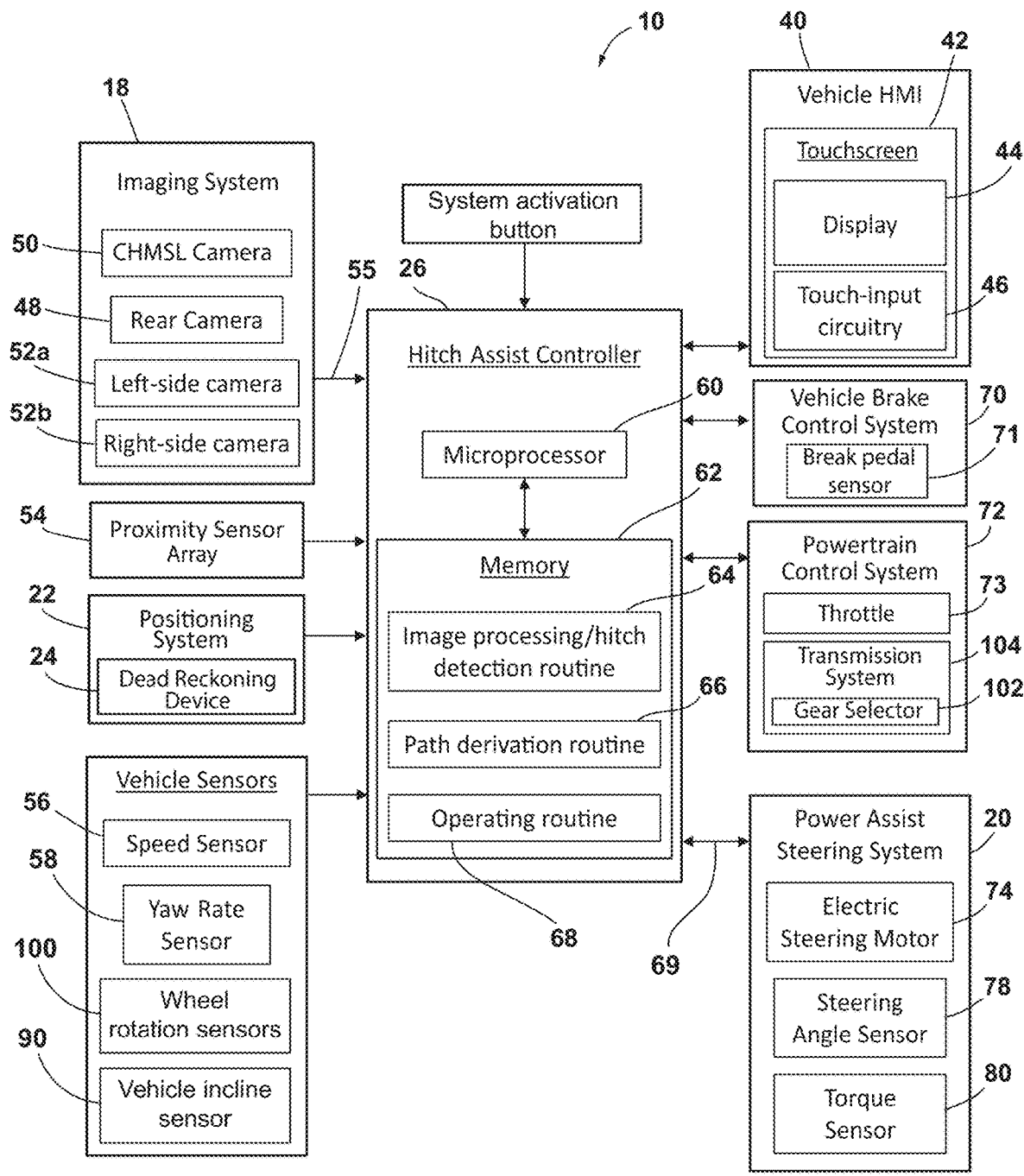
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupling feature 14, that the controller 26 of the hitch assist system 10 may process with various routines to determine the height H and position of coupling feature 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering signal 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
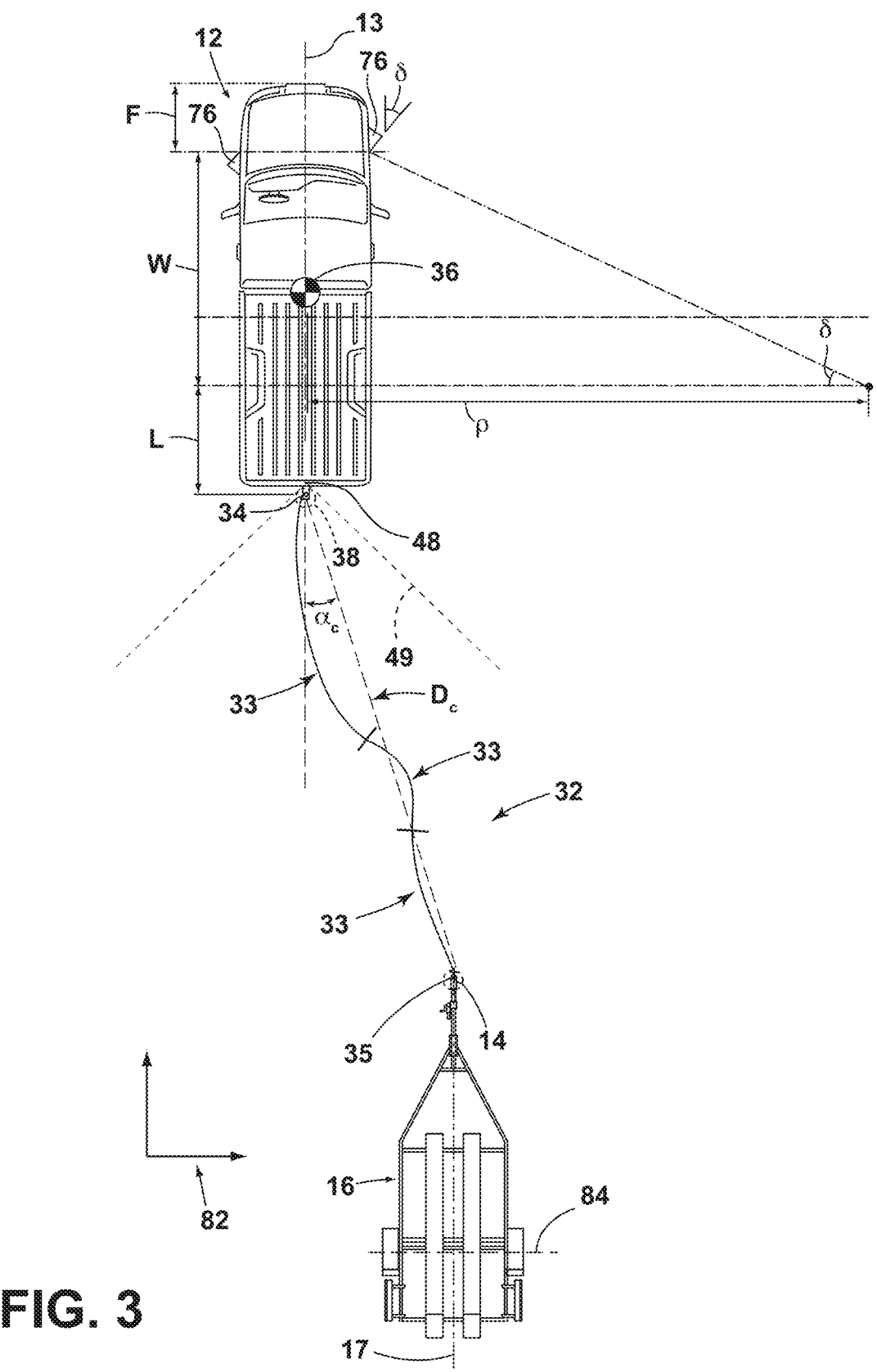
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\dot{\gamma}$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupling feature 14 of trailer 16, which can reduce the potential for contact with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated contact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupling feature 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system 18 for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light ("CHMSL") camera 50 (that may be included in the array for the above-described CHMSL 23, and side-view cameras 52a and 52b, although other arrangements including additional or alternative cameras are possible. In one example, imaging system 18 can include rear camera 48 alone or can be configured such that system 10, as discussed further below, selectively utilizes only rear camera 48 and CHMSL camera 50 in a vehicle with multiple exterior cameras. In another example, the various cameras 48, 50, 52a, 52b included in imaging system 18 can be positioned to generally overlap in their respective fields of view, which may correspond with rear camera 48, CHMSL camera 50, and side-view cameras 52a and 52b, respectively. In this manner, image data 55 from two or more of the cameras can be combined in image processing routine 64, or in another dedicated image processor within imaging system 18, into a single image for purposes of identifying the coupling feature 14 using the image processing routine 64. In an extension of such an example, the image data 55 can be used to derive stereoscopic image data that can be used to reconstruct a three-dimensional scene of the area or areas within overlapped areas of the various fields of view including any objects (obstacles or coupling feature 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52*a*, and 52*b* within imaging system 18. In either example, the image processing routine 64 can include information related to the positioning of any cameras 48, 50, 52*a*, and 52*b* present on vehicle 12 or utilized by system 10, including relative to the center 36 (FIG. 1) of vehicle 12, for example such that the positions of cameras 48, 50, 52*a*, and 52*b* relative to center 36 and/or to each other can be used for object positioning calculations and to result in object position data relative to the center 36 of vehicle 12, for example, or other features of vehicle 12, such as hitch 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupling feature 14 within image data 55. In an example, the image processing routine 64 can first attempt to identify any trailers 16 within the image data 55, which can be done based on stored or otherwise known visual characteristics of trailer 16, of a number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupling feature 14 of that trailer 16 within the image data 55 based, similarly, on stored or otherwise known visual characteristics of coupling feature 14 or coupling features in general. In another embodiment, a marker in the form of a sticker or the like may be affixed with trailer 16 in a specified position relative to coupling feature 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupling feature 14 relative to such a marker so that the position 28 of coupling feature 14 can be determined based on the marker location. Additionally or alternatively, controller 26 may seek confirmation of the determined coupling feature 14, via a prompt on touchscreen 42. If the coupling feature 14 determination is not confirmed, further image processing may be provided, or user-adjustment of the position 28 of coupling feature 14 may be facilitated, either using touchscreen 42 or another input to allow the user to move the depicted position 28 of coupling feature 14 on touchscreen 42, which controller 26 uses to adjust the determination of position 28 of coupling feature 14 with respect to vehicle 12 based on the above-described use of image data 55.

In various examples, controller 26 may initially rely on the identification of trailer 16 for the initial stages of an automated hitching operation, with the path 32 being derived to move the hitch 34 toward a centrally-aligned position with respect to trailer 16 with the path 32 being refined once the coupling feature 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupling feature 14 cannot be precisely identified. In this manner, initial rearward movement of vehicle 12 can allow for calibration of various system 10 inputs or measurements that can improve the accuracy of distance measurements, for example, that can help make coupling feature 14 identification more accurate. Similarly, movement of vehicle 12 resulting in a change to the particular image within the data 55 that can improve the resolution or move the coupling feature 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch 34 and coupling feature 14 of trailer 16. Upon initiation of hitch assist system 10, such as by user input on touchscreen 42, for example, image processing routine 64 can identify coupling feature 14 within the image data 55 and at least attempt to estimate the position 28 of coupling feature 14 relative to hitch 34 using the image data 55 in accordance with one of the examples discussed above to determine a distance $D_c$ to coupling feature 14 and an angle $\alpha_c$ of offset between a line connecting hitch 34 and coupling feature 14 and the longitudinal axis of vehicle 12. Image processing routine 64 can also be configured to identify the trailer 16 overall and can use the image data 55 of trailer 16, alone or in combination with the image data 55 of coupling feature 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch 34 with coupling feature 14 without contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupling feature 14, as discussed above, can, in one example, execute path derivation routine 66 to determine vehicle path 32 to align the vehicle hitch 34 with coupling feature 14. In particular, controller 26 can have stored in memory 62 various characteristics of vehicle 12, including the wheelbase W, the distance from the rear axle 27 to the hitch 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{max}$ is determined as:

$$\rho_{min} = \frac{W}{\tan\delta_{max}}. \quad (2)$$

Path derivation routine 66 can be programmed to derive vehicle path 32 to align a known location of the vehicle hitch 34 with the estimated position 28 of coupling feature 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupling feature 14 and a forward or rearward distance to coupling feature 14 and derive a path 32 that achieves the needed lateral and forward-backward movement of vehicle 12 within the limitations of steering system 20. The derivation of path 32 further takes into account the positioning of hitch 34, based on length L, relative to the tracked location of vehicle 12 (which may correspond with the center 36 of mass of vehicle 12, the location of a GPS receiver, or another specified, known area) to determine the needed positioning of vehicle 12 to align hitch 34 with coupling feature 14. It is noted that hitch assist system 10 can compensate for horizontal movement $\Delta x$ of coupling feature 14 in a driving direction by determining the movement of coupling feature 14 in the vertical direction $\Delta y$ that will be needed to receive hitch 34 within coupling feature 14. Such functionality is discussed further in copending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch 34 into the above-described offset alignment with coupling feature 14. It is noted that variations in the depicted path 32 may be used. It is further noted that the estimates for the positioning $D_c$, $\alpha_c$ of coupling feature 14 may become more accurate as vehicle 12 traverses path 32, including to position vehicle 12 in front of trailer 16 and as vehicle 12 approaches coupling feature 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupling feature 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
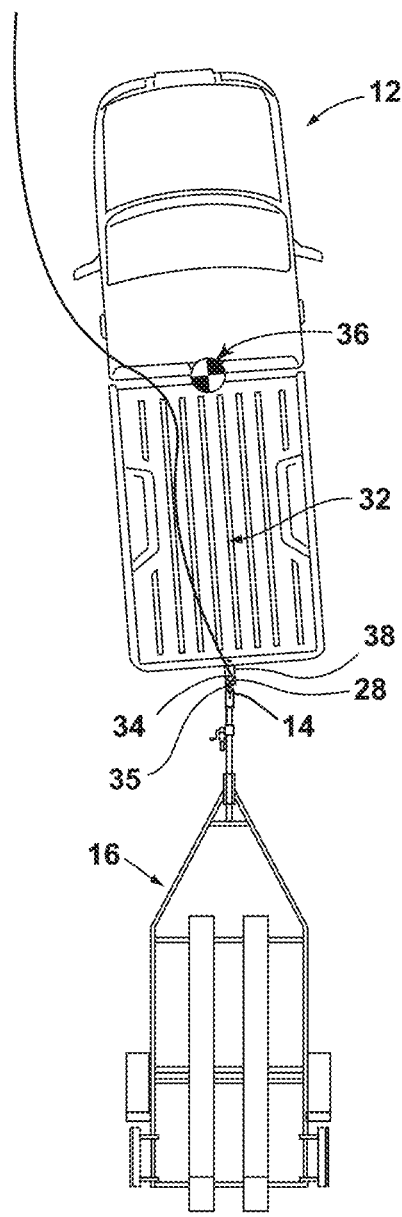
FIG. 4 is an overhead schematic view of the vehicle during a subsequent step of the alignment sequence with the trailer and showing the position of a hitch of the vehicle at an end of a derived alignment path.
Figure 5:
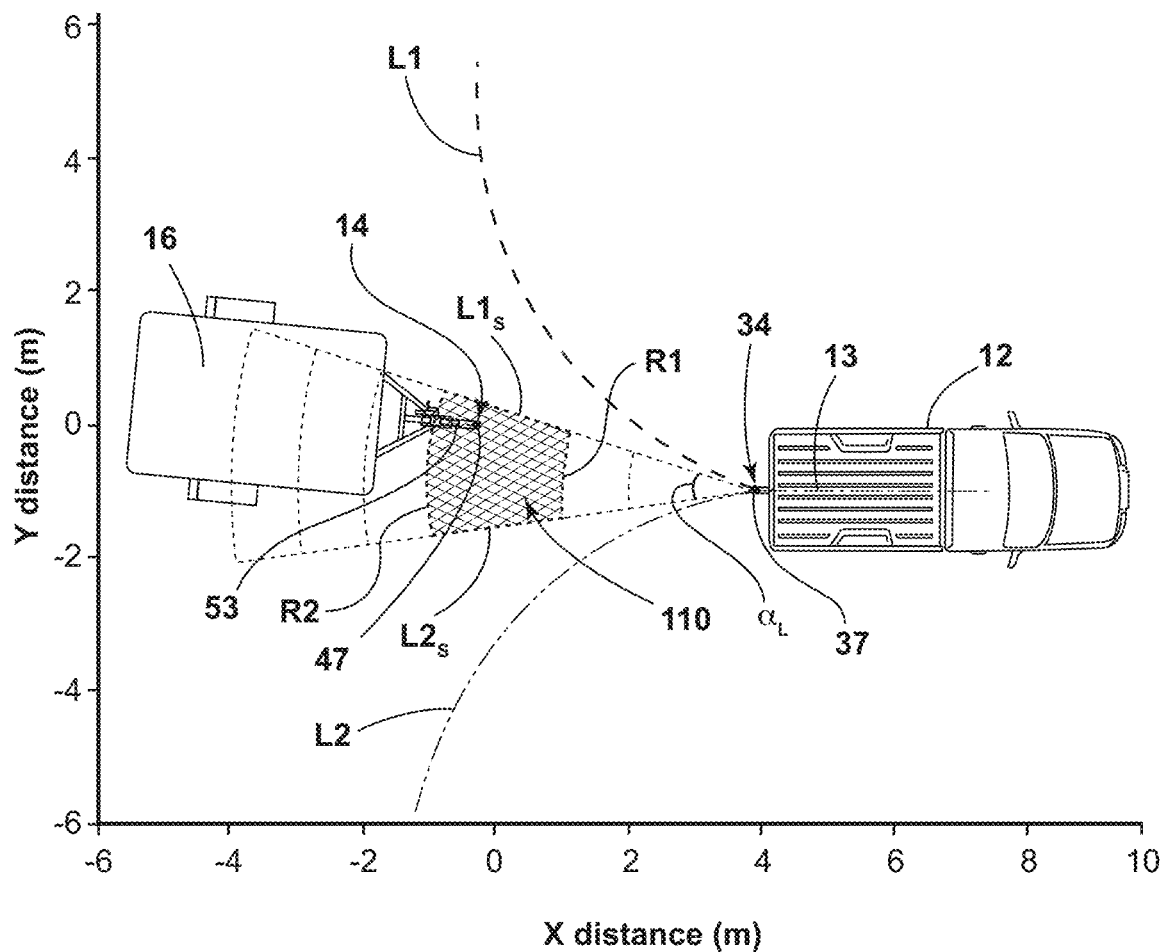
FIG. 5 is a schematic illustration of an acceptable target zone for a conventional trailer relative to a vehicle including the present system.

As shown in FIG. 4, once the trailer 16 and coupling feature 14 have been identified, and system 10 determines the path 32 to align hitch 34 with the coupling feature 14, the controller 26 executing operating routine 68 may continue to control vehicle 12 until hitch 34 is in the desired endpoint 35 relative to coupling feature 14 for coupling feature 14 to engage with hitch 34 when coupling feature 14 is lowered into horizontal alignment therewith. In the example discussed above, image processing routine 64 continuously monitors the positioning $D_c$, $\alpha_c$ of coupling feature 14, constantly or once available, during execution of operating routine 68, including as coupling feature 14 comes into clearer view of rear camera 48, with continued movement of vehicle 12 along path 32. As discussed above, the position of vehicle 12 can also be monitored by dead reckoning device 24 with the position 28 of coupling feature 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupling feature 14 can be assumed to be static such that the position of vehicle 12 can be tracked by continuing to track the coupling feature 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupling feature 14 to converge the known relative position of hitch 34 to the desired position 38 thereof relative to the tracked position 28 of coupling feature 14, as discussed above and shown in FIG. 4.

As illustrated in FIG. 3, vehicle path 32 can be determined to achieve the needed lateral and rearward movement within the smallest area possible and/or with the lowest number of maneuvers. In the illustrated example of FIG. 3, path 32 can include three portions defined by steering of wheels 76 in different directions to collectively traverse the needed lateral movement of vehicle 12 during rearward backing segment to bring hitch 34 into the above-described offset alignment with coupling feature 14. It is noted that variations in the depicted path 32 may be used, including based on the initial detection accuracy or requirements and/or the initial position of steered wheels 76. It is further noted that the estimates for the positioning $D_c$, $\alpha_c$ of coupling feature 14 may become more accurate as vehicle 12 traverses path 32, including to position vehicle 12 in front of trailer 16 and as vehicle 12 approaches coupling feature 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be fine-tuned once the image processing routine 64 can identify coupling feature 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

In this manner, the initial determination of the position 28 of trailer 16 to an accepted level of accuracy is needed for execution of the path derivation routine 66 and subsequent automated backing of vehicle 12 along the path 32. Various characteristics or limitations of system 10 may impact the ability of system 10 to identify the trailer 16 (as well as the coupling feature 14, whenever such identification is carried out) in the data 55 received from imaging system 18 under certain conditions or in certain settings. Still further, various vehicle 12 or other system 10 characteristics may impact the ability of system 10 to navigate to reach a trailer 16 that is, nevertheless, present within the image data 55. Depending on the particular configuration of system 10, such characteristics can be partially driven by the imaging system 18 used by system 10. The imaging system 18 may be limited in its ability to identify a trailer 16 and/or coupling feature 14 within the entire field of the image data 55. In an example, it may be assumed, at least for simplicity of illustration, that system 10 only uses rear camera 48 for trailer 16 and coupling feature 14 detection, with rear camera 48 having a field of view 49 that is included in its entirety in the "total field" of the image data 55 (notably, if additional cameras 50,52a,52b are used, the total field of the image data 55 would include the entire assembled image from all such utilized cameras). The imaging system 18 limitations may limit system 10 functionality to only a limited distance between trailer coupling feature 14 and the vehicle 12, as different factors may limit the ability of controller 26 in identifying a trailer 16 or its coupling feature 14 when the trailer 16 and vehicle 12 are too close together or too far apart. For example, as illustrated in FIG. 5, the resolution of the various cameras 48,50,52a,52b in imaging system 18 may impact the ability to identify any trailers 16 or coupling features 14 beyond a maximum distance R1 from vehicle 12 with the particular value of R1 being influenced by ambient conditions, including available light and/or weather conditions (e.g., rain or snow).

Additionally, a minimum distance R2, also illustrated in FIG. 5, for trailer 16 or coupling feature 14 detection may be realized because certain implementations of system 10 may rely on dynamic readings (such as of the ground surface behind vehicle 12 or other features visible around coupling feature 14) to calibrate system 10 and or to track vehicle 12 speed in reversing and to track the position of coupling feature 14 during system 10 operation. In particular, in the above example where only rear camera 48 is used by system 10, it may be necessary to detect motion within the field of view 49 to identify distance to the coupling feature 14 and to provide accurate tracking and boundary resolution (an aspect of image processing routine 64). Further, the operating routine 68 may include a longitudinal control algorithm that relies on precise control of the vehicle 12, and a minimum amount of travel distance corresponding with R2 in an example, is required to calibrate certain braking and powertrain variables to achieve such vehicle control. Still further, if a trailer 16 is too close to vehicle 12, various features of the trailer 16 may appear as trailers themselves to the image processing routine 64, meaning that to assist system 10, the trailer 16 should be beyond the minimum distance R2 such that a proportionality of features, including of trailer 16 itself as well as of trailer 16 relative to the total field of image data 55, is optimized for image processing routine 64 functionality.

As also shown in FIG. 5, other limitations of system 10 functionality may add constraints to the target zone of operation. In this respect, system 10 may not be capable of maneuvering vehicle 12 towards all locations in an initial view of the rear camera 48 (i.e., during trailer 16 or coupling feature 14 identification). In particular, system 10 may be restricted in its ability to reach a potential target position due, but not limited, to a lateral span that is a function of a distance range and the steering angle δ limitations of vehicle 12. In one aspect, the maximum steering angle $\delta_{max}$ of the vehicle 12 determines the lateral range, as a function of distance $D_c$ to coupling feature 14, as discussed further below. In general, an implementation of system 10 may restrict maneuvering of vehicle 12 to a single reversing motion that, while potentially including steering in both the left and right directions, does not incorporate forward driving of vehicle 12 between successive instances of reverse driving, for example. In this manner, the maximum lateral distance that can be traversed by vehicle 12 in an automated hitching operation is limited by the maximum steering angle $\delta_{max}$. As the vehicle 12 travels laterally by turning the steered wheels 76 and reversing, the left and right lateral vehicle control limits L1,L2 of system operability 10 are determined as, essentially, a theoretical hitch 34 path extending rearward of the vehicle corresponding with steering of vehicle 12 at a particular steering angle δ under reversing of vehicle 12 to either side. In this manner, the lateral vehicle control limits L1,L2 of system 10 may extend outwardly from vehicle 12, with increasing distance away from vehicle 12 and may be characterized or determined based on left and right steering path limits of vehicle 12.

In a further aspect, the lateral vehicle control limits L1,L2 may be limited by an operating angle $\delta_{op}$ that is lower than maximum steering angle $\delta_{max}$. The difference between the operating angle $\delta_{op}$ and the maximum steering angle my vary based on criteria that can be selected to optimize or improve the performance of system 10, to address various constraints on the operation of system 10, or to increase the predictability or reliable performance of system 10. In one aspect, it may simply be desired for system 10 to be prevented from calling for a maximum steering angle $\delta_{max}$ to allow system 10 to manage variations that may arise in the actual maximum angle $\delta_{max}$ reachable by the steering system 20 under varying conditions, to prevent wear on steering system 20, or the like. In this manner, the lateral vehicle control limits L1,L2 of system 10 functionality may be further limited.

Because of these limitations, the present system 10 may be configured to only function with trailers 16 and associated coupling features 14 positioned inside the target position area 110 relative to the vehicle 12, as shown in FIG. 5. The target position area 110 may be determined by the factors listed above, and, potentially, any additional factors that affect the system 10 capability. To ensure such positioning of vehicle 12 relative to trailer 16, system 10 can be generally configured to direct the user to position vehicle 12 relative to trailer 16 such that trailer 16 (or coupling feature 14) is within such a target area 110 of the field of view of the utilized cameras, such as field of view 49 of rear camera 48, and the corresponding image data 55. As discussed above, the limitations of camera 48 and the requirements of image processing routine 64 and operating routine 68 can establish the maximum distance R1 and the minimum distance R2 from the rear of vehicle 12 for coupling feature 14 identification, which can establish the bounds of the target position area 110 with general respect to the longitudinal axis 13 of vehicle 12. In the illustrated example, the maximum distance R1 and the minimum distance R2 can be measured from the hitch 34 (or alternatively the rear camera 48, which may be positioned adjacent hitch 34, albeit at a different height) at a consistent distance therefrom such that R1 and R2 are radially spaced about the hitch 34 (or rear camera 48).

As shown in FIG. 5, the lateral limits L1,L2 can extend rearward from hitch 34 along arced paths based on the steering characteristics of vehicle 12, including the steering limit $\delta_{max}$ of steering system 20 and other limitations or performance parameters. In particular, the performance of system 10 in controlling vehicle 12 and/or providing a generally-acceptable path 32 may be improved, as discussed above, by configuring path derivation routine 66 to maintain the steering angle δ below the maximum $\delta_{max}$ by a predetermined amount or at the otherwise established operating angle $\delta_{op}$. In one example, the operating angle $\delta_{op}$ may be less than the maximum steering angle $\delta_{max}$ by a preset or adjustable offset, which may be a set angle (e.g., about 3° to about 10°) or by a preset or adjustable percentage based proportion (e.g., about 5% to about 25%). In other examples, discussed above, the operating angle $\delta_{op}$ may be based on specific characteristics of vehicle 12 based on other set or adjustable parameters. As shown in FIG. 5, the projected lateral limits L1,L2 can each be a single arc-shaped segment extending from the hitch 34 in a direction toward the coupling feature 14. From the determined operating angle $\delta_{op}$, system 10 can determine the lateral limits L1,L2 within a frame of reference centered at hitch 34 and its x-axis aligned with the longitudinal axis 13 of vehicle 12. Notably, the length L, as well as the wheelbase W, which affect the positioning of the turn center for the determined steering angle are configurable based on the various vehicle parameters and can be stored in memory 62 and the upper limit of angle α can also be adjusted based on the parameters that influence R1, for example, such that the lateral limits L1,L2 are determined for an appropriate distance to intersect or cross the longitudinal limit R1. As shown in FIG. 5, the target position area 110 for coupling feature 14 positioning, referred to as the "target zone" 110 can, thusly, be defined as the area bounded by the limits R1, R2, L1, and L2. In the example of FIG. 5, the target area 110 can be further restricted within the detectable and reachable areas discussed above, including within an area that can be reached along a path 32 from hitch 34 that is defined by a straight line. Accordingly, the target area 110 that is the subject of the coaching routine discussed herein may not directly correspond with the complete area within which detection of and navigation to coupling feature 14 is possible, but may rather be an area that can be reached within a restricted variation of operating routine 68. Further details on the determination for L1 and L2 are disclosed in co-pending, commonly-assigned U.S. patent application Ser. No. 16/208,777.

Figure 6:
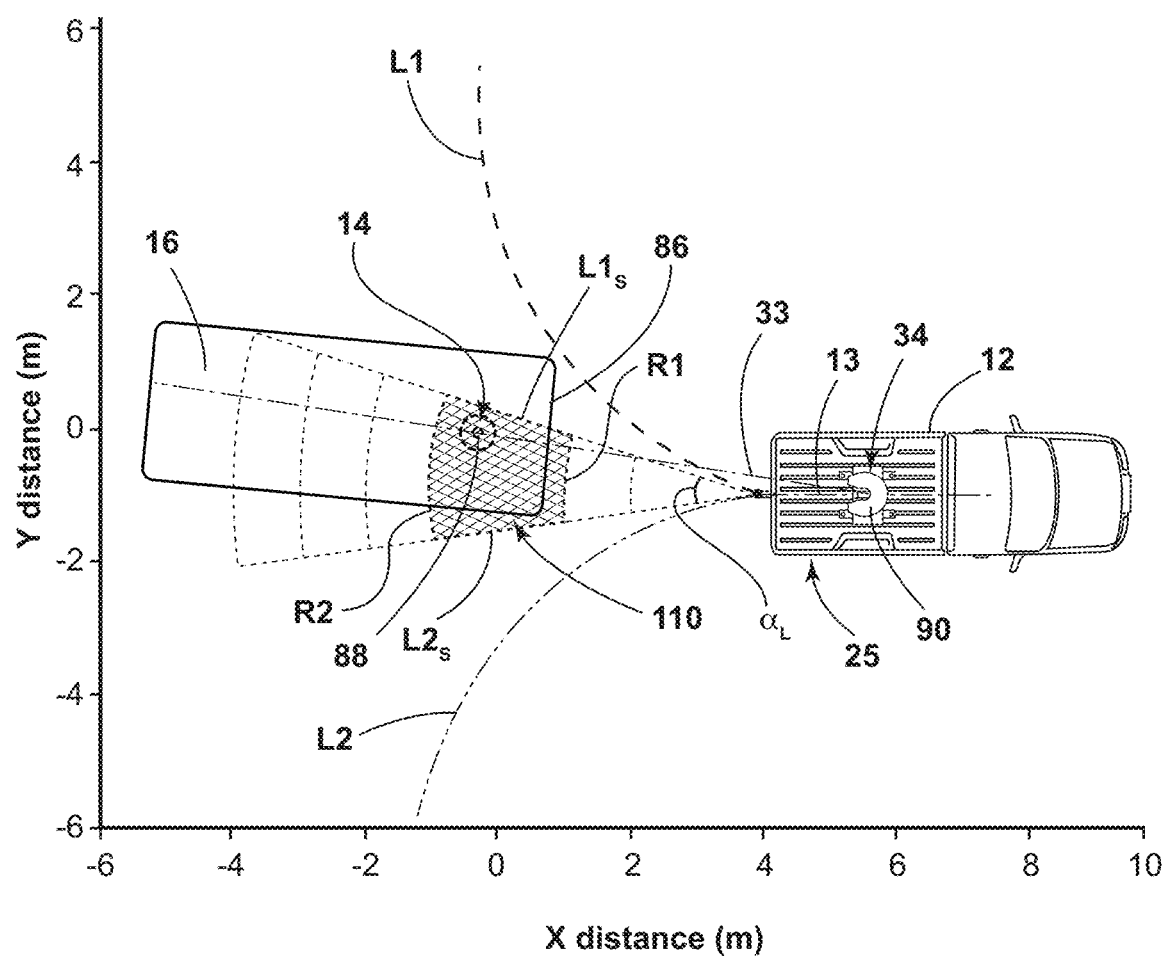
FIG. 6 is a schematic illustration of an acceptable target zone for positioning of a fifth-wheel trailer relative to a vehicle including the present system.

Turning now to FIG. 6, the present system 10 can be configured to operate similarly to the above description when the trailer 16 is a so-called fifth-wheel type trailer. In general, a fifth wheel type trailer includes an elevated nose 86 (which can be incorporated into the box of a utility or camper trailer or can consist of a trailer "gooseneck" in the case of a thusly-named gooseneck trailer) having a kingpin 88 extending downward therefrom. In this manner the kingpin 88 acts as the coupling feature 14 in replacement of the cup 47 included on a standard trailer 16, as discussed above. In connection with the use of a fifth-wheel type trailer 16 the vehicle 12 can include a fifth-wheel type hitch 34 consisting of a receiver 90 configured to receive the kingpin 88 in a longitudinal direction and releasably retain the kingpin 88 therein in a rotatable manner. The receiver 90 is further adapted to support the nose 86 of the trailer 16 for articulation of the trailer 16 thereon during vehicle 12 movement in towing the trailer 16. As further shown, the receiver 90 is typically mounted in an aligned position with respect to both the rear axle 27 and the centerline 13 of the vehicle, which provides improved steering dynamics for the combined vehicle 12 and trailer 16. As can be appreciated, the desired positioning of the receiver 90 comprising the hitch 34 in the present example generally requires the use of a towing vehicle 12 in the form of a pickup truck (aside from the use of various commercial vehicles), as described above, with the receiver positioned along the floor of the trailer bed 25. In this manner, the tailgate 91 positioned on the rear of the vehicle 12 and enclosing the trailer bed 25 must be opened or removed to engage the kingpin 88 with the receiver 90 by movement of the kingpin 88 into the truck bed 25. In one aspect, this arrangement may further restrict the positioning of the vehicle 12 with respect to trailer 16 that must be achieved prior to the initiation of an automated hitching maneuver by the present system 10. In particular, the vehicle 12 should be positioned in front of the trailer 16, such as by having the receiver 90 within a certain angle of the extended centerline 92 (heading) of the trailer 16 and/or with the longitudinal axis 13 of the vehicle 12 within a predetermined angle of the trailer 16 heading 92 (e.g, five degrees or less). Such requirements are to be understood as being in addition to the requirement that the coupling feature 14 (i.e., the kingpin 88) be within the target alignment area.

Figure 7:
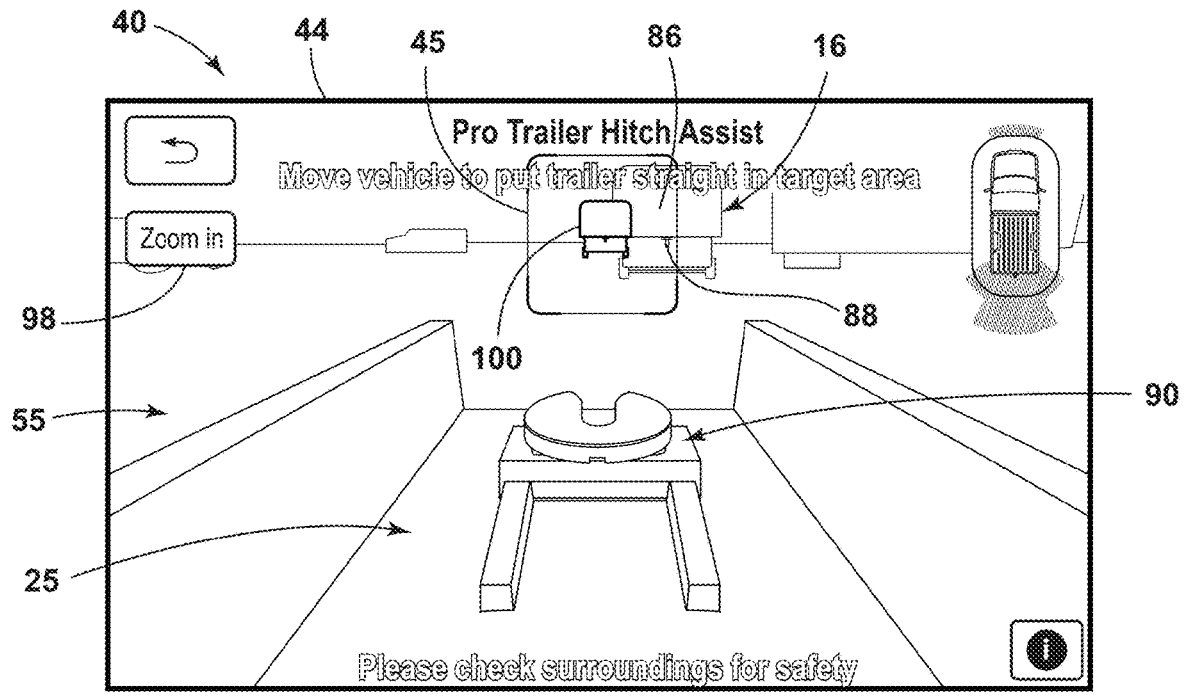
FIG. 7 is an example view of image data presented on a vehicle HMI screen from a camera selected to correspond with an identified trailer type.
Figure 8:
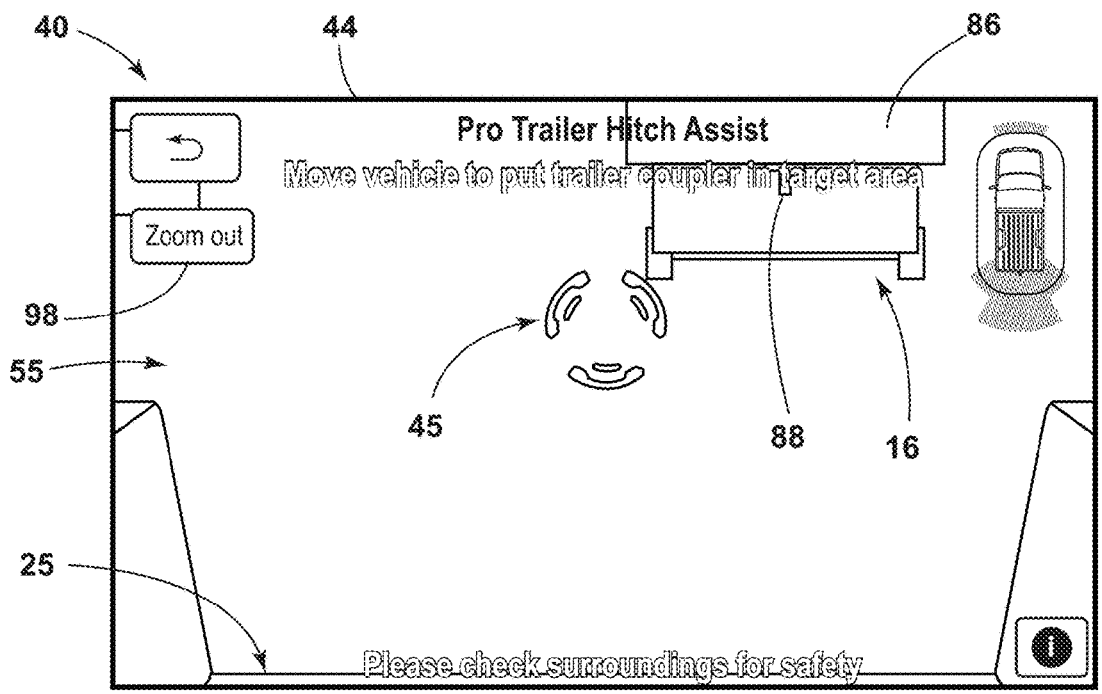
FIG. 8 is an example view of image data presented on a vehicle HMI screen from a camera and a zoom level selected to correspond with an identified trailer type and a current stage of the alignment sequence.
Figure 9A:
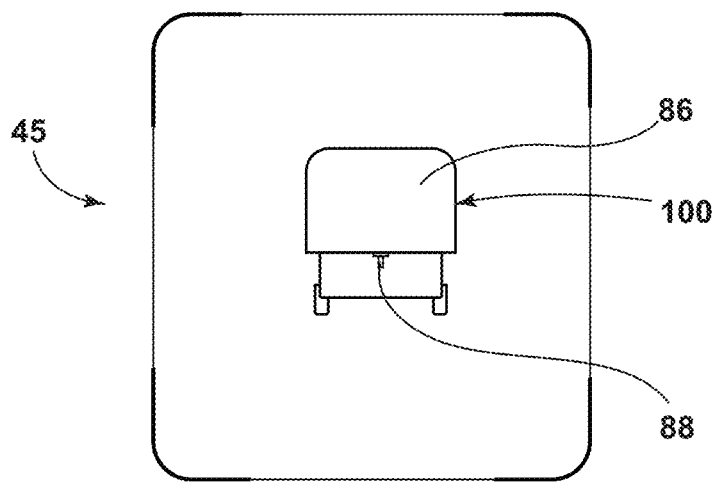
FIGS. 9A and 9B are examples of graphic target with trailer type identification images selected or developed to correspond with the identified trailer type.
Figure 9B:
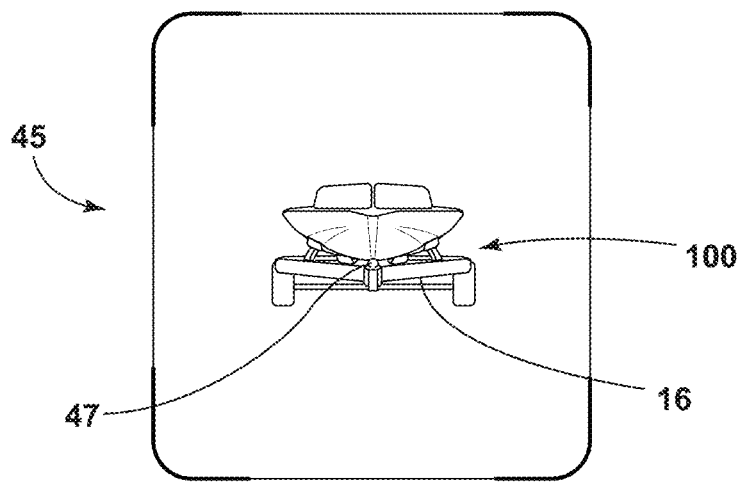

As discussed in the commonly-assigned U.S. patent application Ser. No. 16/208,777, the entire disclosure of which is incorporated by reference herein, to help the driver of the vehicle 12 position the vehicle 12 relative to the trailer 16 and/or coupling feature 14 for initiation of an automated hitching procedure, a graphical representation of the target position area 110 can be presented to the user as an overlay of a portion of the image data 55 on the screen 44 of the vehicle HMI 40. As shown in FIGS. 7 and 8, the graphical target 45 can be presented in a manner that doesn't directly align with the precise location of the target position area 110, but instead can correspond with the location of the target position area 110 be expected to reasonably achiever relative positioning of the vehicle 12 with respect to the trailer such that the trailer 16 and/or coupling feature 14 is within the target position area 110 by movement of the vehicle 12 such that the trailer 16, as viewed in the image data 55 on screen 44 is wholly or partially within the graphical target 45. The graphical target 45 can be adapted to indicate to the user when appropriate alignment has been achieved, such as by a prescribed movement or change in appearance or color. Additionally, the controller 26 can be configured to give additional guidance or instruction in connection with or in addition to the graphical target 45 by way of the screen 44, as discussed in various examples in U.S. patent application Ser. No. 16/674,589, the entire disclosure of which is incorporated by reference herein.

As discussed above, the positioning requirements of the vehicle 12 with respect to the trailer 16 can vary with the type of trailer 16, including but not limited to whether the trailer 16 is a fifth-wheel type (FIG. 6) or a conventional trailer (FIG. 5). Additionally, the usefulness and/or availability of the respective portions of the image data 55 from the different cameras, particularly rear camera 48 and CHMSL camera 50 can vary with respect to the trailer type. Notably, because the connection of a kingpin 88 with a corresponding receiver 90 in a fifth-wheel type trailer coupling requires that the tailgate 91 be open, the rear camera 48 may not be available at all. Additionally, the use of the CHMSL camera 50 may be useful for visualization during the final hitching stages of a fifth-wheel type trailer connection because the field of view 51 associated therewith captures the receiver 90, which can allow the user to have visual confirmation that the alignment is proceeding as desired. During the initial alignment of vehicle 12 with trailer 16 (i.e., prior to the initiation of the automated hitching maneuver), however, the farther forward positioning of the CHMSL camera 50, combined with the relatively wide angle of vehicle cameras, can be such that the trailer 16 appears farther away and that an appropriately-sized graphical target 45 appears relatively small to the extent that alignment using the screen 44 and the graphical target 45 becomes difficult. Accordingly, system 10 can be configured to identify or otherwise recognize the type of trailer after activation of system 10 and during the initial alignment maneuvering and to select or adjust the portion of the image data 55 presented to the user on the screen 44. System 10 can, as further discussed below, provide visual confirmation of the recognized trailer type and, in the particular case of a recognized fifth-wheel trailer type, provide additional guidance with respect to the above-discussed relative headings required for initiation of an automated hitching maneuver.

Turning to FIGS. 7 and 8, an example view of screen 44 included in HMI 40 is depicted as presenting a portion of the image data 55 received by controller 26 from imaging system 18. In the present instance, the controller 26 has applied, for example, a subroutine of the image processing routine 64 to identify trailer 16 in the image data 55 and to determine that the trailer 16 is a fifth-wheel type trailer 16. In this respect, on system 10 startup, the controller 26 may present image data 55 received specifically from the rear camera 48 and/or a composite image from one or more of the cameras included in imaging system 18 with adjustments made to make the image appear seamless and cropping to present only a portion of the composite image. In this respect, a "portion" of the image data 55, as referred to herein, can indicate image data 55 from one or more cameras or a cropped composite image from all cameras, a composite image of multiple cameras, or the like. In connection with the presentation of such a portion of the image data 55 on the screen 44, the controller 26 can use all of the available image data 55, for example, to attempt to identify a trailer 16 within the image data 55. In this respect, system 10 can be capable of identifying multiple trailers 16 within the image data 55, simultaneously. Upon identification of any such trailers 16 within the image data 55, controller 26 can apply additional image processing to identify the trailer type based on, for example, the identification of known characteristics attributable to various known trailer types, including the presence of a cup 47 for the coupling feature 14 or a kingpin 88, the identification of an elevated trailer nose 86, including ahead and/or above a trailer box, and other such features that would be apparent to those skilled in the art. Additionally, the controller 26 can attempt to identify any hitch features 34 attached to the vehicle, including the presence of a hitch ball 37 beyond the rear bumper 41 within the field of view 49 of rear camera 48 and/or the presence of a fifth-wheel receiver 90 within the bed 25 in the field of view 51 of the CHMSL camera 50, with the presence of such hitching feature 34 being accounted for in the algorithm and/or scoring associated with the identification of the trailer type. When, as shown in FIG. 7, the trailer 16 is identified as a fifth-wheel type trailer, including by way of the further identification of receiver 90, the controller 26 can present the portion of the image data 55 corresponding with that of the CHMSL camera 50 to be presented on screen 44. In an additional aspect, the controller 26 can be configured to detect when the tailgate 91 is opened or removed and default to the presentation of the image data 55 portion associated with the CHMSL camera. In one aspect, the system 10 can, in the absence of image data 55 from rear camera 48 or a determination that the tailgate 91 is open such that the image data 55 from rear camera 48 (which is accordingly directed at the ground) is not useable, initially present the portion of image data 55 corresponding with the CHMSL camera 50, as depicted in FIG. 7.

As shown in FIG. 8, whether the controller 26 initially presents the portion of image data 55 corresponding with the rear camera 48 or the CHMSL camera 50, according to the examples discussed above, the identification of a trailer 16 determined to be a fifth-wheel type trailer 16 can also correspond with the controller 26 selecting a further portion of the image data 55 from CHMSL camera 50 for presentation on the screen 44 that is smaller than the field of view 51 of the CHMSL camera 50. Such a portion can be enlarged to fill the screen 44, such as by digital zooming, cropping, and/or scaling of the selected portion of the image data 55. As shown in FIG. 8, the portion of the CHMSL camera 50 image data 55 can be such that the majority of the truck bed 25 is not visible (including the receiver 90, which does not need to be seen for the guided initial alignment discussed herein) and, further such that both the trailer 16 and the graphical target 45 appear larger on the screen 44 for easier relative visualization. In one aspect, the selection of the portion of the CHMSL camera 50 image data 55 presented can be selected or configured to approximate the view from the rear camera 48 such that a generally consistent feel for the user of system 10 to a user among different trailer types is maintained. In a further aspect, system 10 can allow the user to change the view presented, such as by switching among available cameras (48, 50, 52a, and 52b), such as by swiping over the view, and or adjusting the zoom (in or out), for example, using a soft button 98 depicted on the screen 44 and superimposed over the image data 55 portion. Such adjustment can be incremental or can simply swap between the full view and the system-determined zoomed view.

Additionally, as shown in FIG. 7, when controller 26 determines the trailer type corresponding with one or more trailers 16 in the image data 55, a trailer type indicator 100 can be presented on the screen 44 in connection with the portion of the image data 55 also shown on screen 44. In the illustrated example, the trailer type indicator 100 is a depiction of the determined trailer type presented within or as a portion of the graphical target 45. In one aspect, when multiple trailers 16 are present and detected within the image data 55, the trailer depiction of the trailer type indicator 100 can correspond with the one of such trailers 16 that is closest to the target area 100 and/or the graphical target 45. The controller 26 can select or develop the depiction used in the trailer type indicator 100 in a number of different ways. In one example, the controller 26 can have multiple preselected images stored in memory and can select the one of such images that is indicated as corresponding with the identified trailer type (e.g. A-frame, A-frame with boat, box, flat-bed, fifth-wheel, gooseneck, or the like). In one aspect, the user can swipe on the trailer type indicator 100 to cycle through the images as a way of confirming or correcting the identification made by the controller 26. Additionally or alternatively, system 10 can provide a process by which the user can store information related to particular trailers in memory 62 to be retrieved at or prior to system 10 initiation. In such an implementation, the controller 26 can present assign the known type of a selected trailer as the detected trailer type and present the trailer type indicator 100 accordingly. Additionally, the system 10 can be configured to default to a selection or depiction of the last-selected trailer and can override such a detection at a user indication or by visual determination that the identified trailer 16 does not correspond with the last-selected trailer. If the trailer is specifically selected as a new trailer or a prior selection has otherwise been overridden, a generic graphical target 45 can be show, such as a blank box, or the bulls-eye type graphical target 45' shown in FIG. 8.

In another example, controller 26 can generate the depiction based on the image data 55 identified as corresponding with the identified trailer 16. In such an example, the controller 26 can generate a three-dimensional ("3-D") representation of the trailer 16, which can be graphically simplified, such as by matching known shapes to identified areas of the rendering, tracing an outline of the rendering, or the like. Examples of such simplified depictions are show in FIG. 9A, which shows trailer type indicator 100 depicting a fifth-wheel type trailer 16, and FIG. 9B, which shows trailer type indicator 100 depicting a a-frame trailer 16 with a boat. In one aspect, such a depiction can be dynamic and can correspond with the trailer 16 as seen in the image data 55, including from a quarter view, a side, view, a head-on view, or the like. In other aspects, the view can be further simplified to consistently present a head-on view, as shown in FIG. 7. The depiction of the trailer for the trailer type indicator 100 can, additionally or alternatively, be adapted based on the particular zoom level of the view shown on the screen 44 and/or can be changed in size to correspond with the relative size of the trailer 16 on the screen 44, including as the vehicle 12 moves toward or away from the trailer 16.

Figure 10:
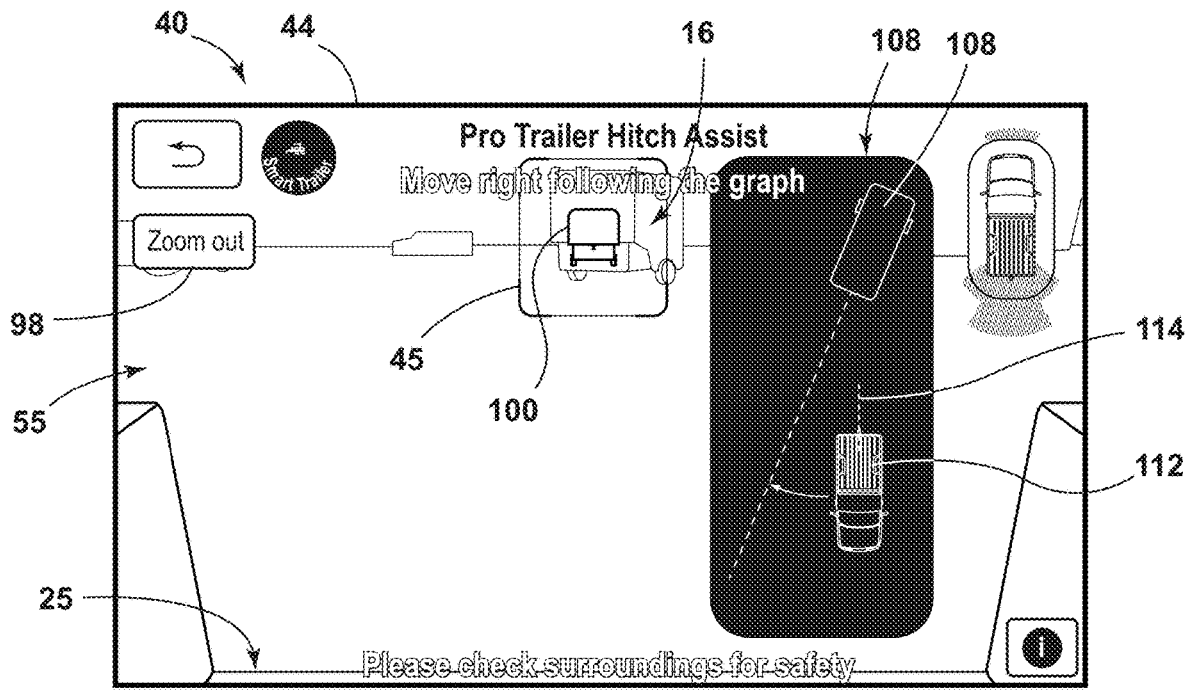
FIG. 10 is an example view of image data presented on a vehicle HMI with an instruction image overlaid thereon in response to the system identifying a user difficulty in achieving a required initial alignment position with respect to the trailer.
Figure 11:
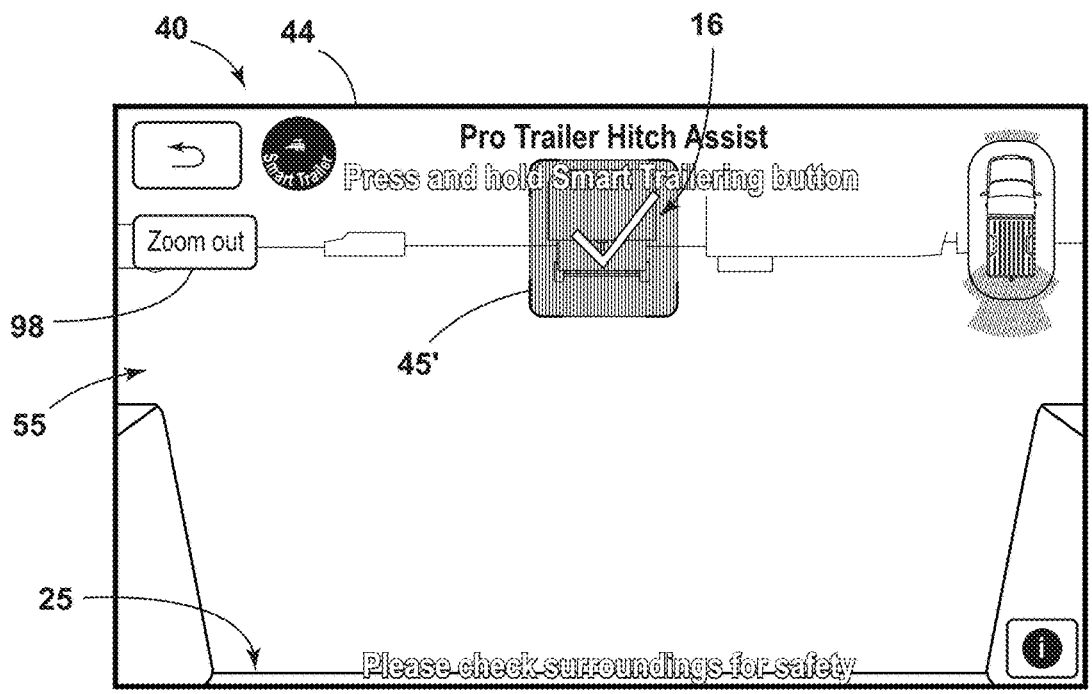
FIG. 11 is an example view of image data presented on a vehicle HMI with a graphical target image overlaid thereon and adapted to indicate that a required initial alignment position with respect to the trailer has been achieved.
Figure 12:
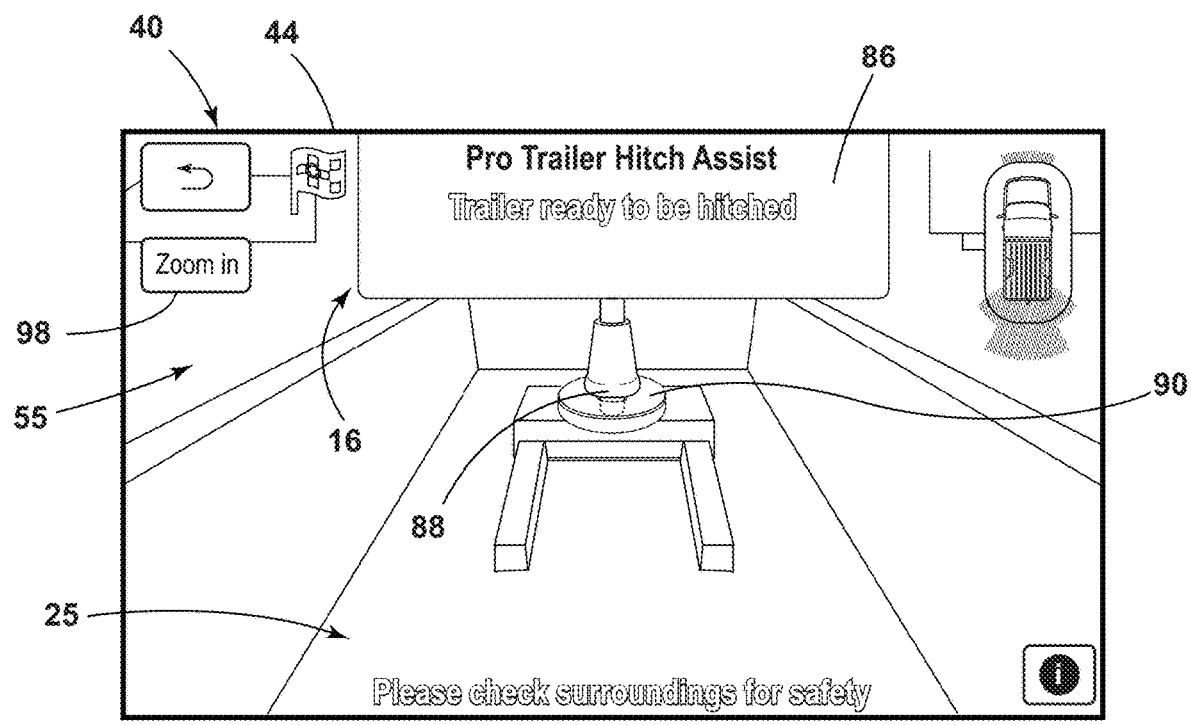
FIG. 12 is an example view of image data presented on a vehicle HMI with a graphical indication overlaid thereon to indicate that an automated backing maneuver has aligned a vehicle hitch feature with a trailer coupler feature.

Turning to FIG. 10, in another aspect system 10 can be configured to determine when a user is having difficulty positioning the vehicle 12 with respect to an identified fifth-wheel type trailer 16. As discussed above, such positioning for a vehicle 12 with respect to an identified fifth-wheel type trailer 16 can include both the positioning of vehicle 12 such that the trailer 16 and or kingpin 88 coupling feature 14 is within the target area 110 and that the heading 33 of vehicle 12 is within a predetermined threshold angle with respect to the heading 92 of trailer 16. In certain aspects, a user may have difficulty in matching both criteria simultaneously or may have difficulty understanding which criteria is not met in the event that system 10 continues to request that the user achieve proper alignment. In one implementation, the controller 26 can detect user difficulty automatically, if the number of gear changes (assessed by monitoring the gear selector 102 of the transmission system 104) passes a certain threshold (e.g. three or more, four or more, etc.), the distance traveled by the vehicle 12 while system 10 is active exceeds a predefined threshold (e.g. 50 feet, 100 feet, or the like), if a time elapsed during motion exceeds a set threshold (e.g., 45 seconds, 1 minute, etc.), or some combination of such indicators. If user difficulty is detected in such a manner, controller 26 can present an instruction to the user. In the example shown in FIG. 10, the instruction is in the form of an instruction graphic 106 that includes a graphical vehicle representation 108, a graphical trailer representation 112, heading indications 114 and 116 for the vehicle 12 and the trailer 16, respectively and a guide image in the example form of an arrow 118 indicating the direction in which vehicle 12 should be moved to achieve the desired positioning. The heading angles in the instruction graphic 106 can be determined by functionality included in, for example, the image processing routine 64. In this respect, controller 26 can continue to monitor the vehicle 12 surroundings (including trailer 16), as well as the vehicle state, as discussed above, and actively update the instruction graphic 106, as needed. Once the user, including under guidance of the instruction graphic 106, successfully positions the vehicle 12 the correct position with respect to the trailer 16, system 10 may present a graphic indication to the user indicating that vehicle 12 positioning has been successfully completed and that the system 10 is ready to take over control of vehicle 12 to execute the automated hitching maneuver. As shown in FIG. 10, this indication may be made by way of the target graphic 45, such as by changing the target graphic 45' in color, shape, or other graphical representation to indicate a positive outcome. As shown in FIG. 12, controller 26 can zoom out from the view used for alignment of the vehicle 12 with respect to the trailer 16 at some point during the automated backing maneuver so that the user can see the receiver 90 approaching the kingpin 88 and assess the final alignment upon a further notification 120 from system 10 that the maneuver is complete.

Figure 13:
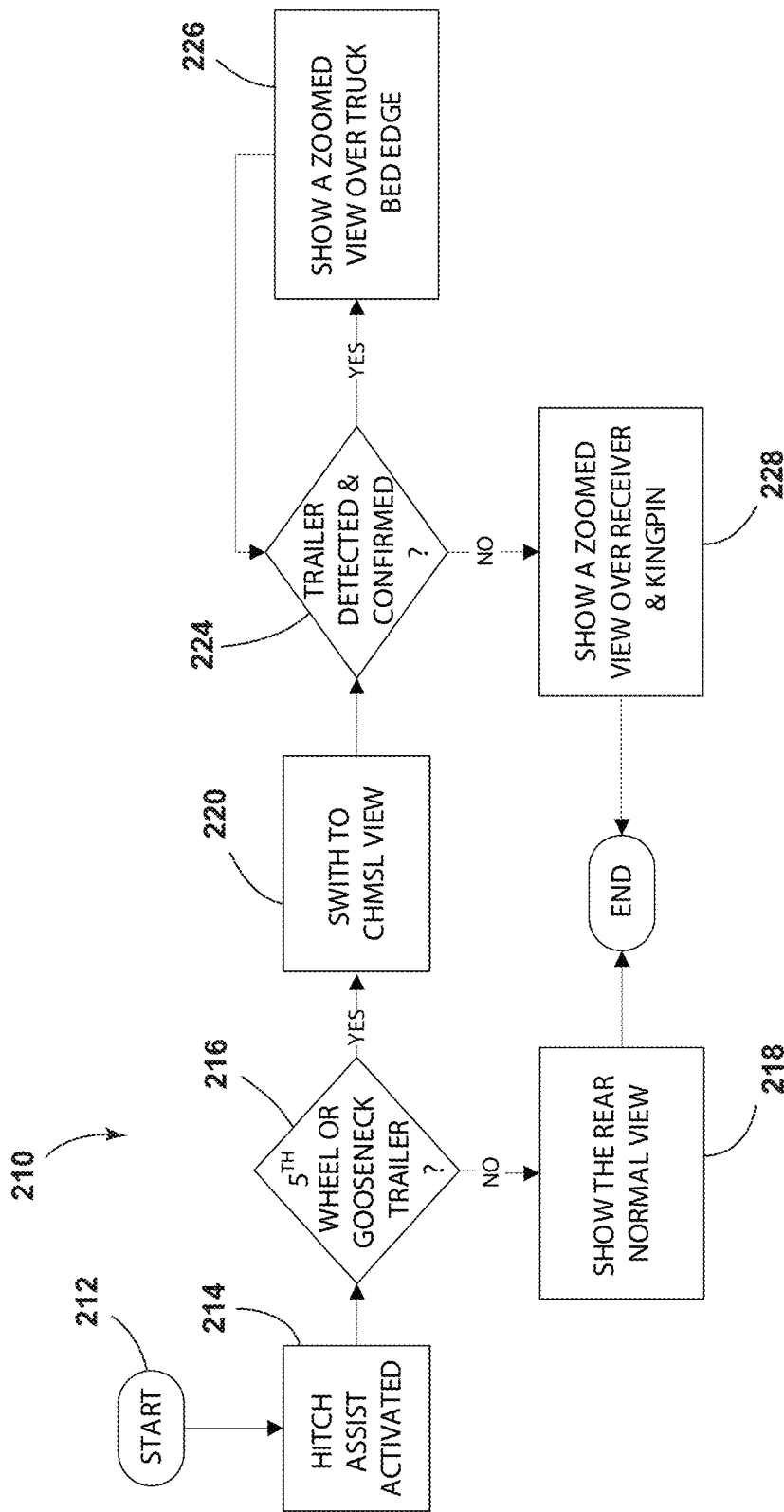
FIG. 13 is a flowchart depicting steps executable by a system for presenting a specific camera view corresponding with an identified target trailer type.

Turning to FIG. 13 a method used in connection with executing an automated hitching maneuver using aspects of the system 10, as described above, is shown. It is to be appreciated that the method 210 can be stored in memory 62 and executed by the controller 26, discussed above, or may be implemented by other devices with appropriate configuration and/or programming. Once the user initiates the process (step 212), the system 10 activates (step 214), including by presenting a default portion of the image data 55 collected by the imaging system 18, such as the specific subset of the data 55 received from rear camera 48, on the screen 44 of the vehicle HMI 40. In further connection with system 10 activation, the controller 26 runs the image processing routine 64 to identify any trailers 16 within the image data 55. In step 216, the controller 26 further uses the image processing routine 64 to determine if the detected target trailer 16 is a fifth-wheel or gooseneck type trailer 16, according to the various examples discussed above. As further discussed above, if the target trailer 16 is determined to be a fifth-wheel or gooseneck type trailer, the controller 26 can cause the portion of the image data 55 presented on the screen 44 to change to the portion corresponding with the subset of image data 55 received from the CHMSL camera 50. If the detected target trailer 16 is not a gooseneck or fifth-wheel type, the view shown on screen 44 can be kept as that from the rear camera 48 through the remainder of the alignment and automated hitching process. In connection with the detection of a fifth-wheel or gooseneck trailer 16 in step 216, the controller 26 can monitor for confirmation of the trailer type, such as by the user, in step 218 and, if confirmed, switch to the scaled, or zoomed view discussed above with respect to FIG. 8, to enlarge the view of the trailer 16 and target graphic 45, while removing the bulk of the truck bed 25 from view (step 220). Until such confirmation is received, the image data 55 view from the CHMSL camera 50 can be presented in a view that shows a larger portion of the field of view 51, including the portion of the truck bed 25 including the receiver 90. The system 10 can continue with the alignment and automated hitching maneuvers using the appropriate view, as discussed above.

Figure 14:
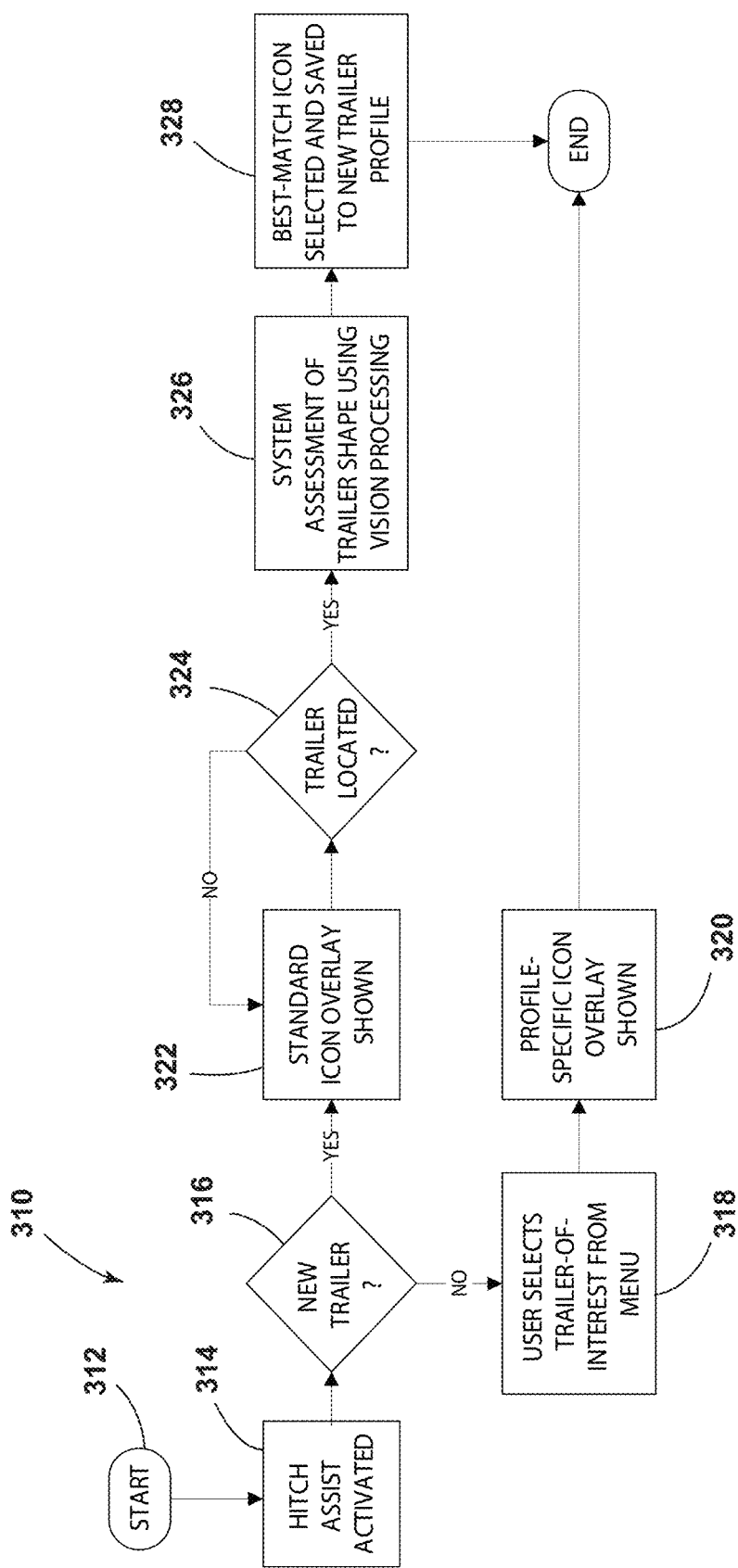
FIG. 14 is a flowchart depicting steps executable by a system for presenting a graphical indication of an identified trailer type on a vehicle HMI screen.

Turning to FIG. 14, a further method used in connection with executing an automated hitching maneuver using aspects of the system 10, as described above, is shown. Again, it is to be appreciated that the method 310 can be stored in memory 62 and executed by the controller 26, discussed above, or may be implemented by other devices with appropriate configuration and/or programming. As shown, the method reflects a process for presenting a trailer type indicator 100 in connection with a graphical target 45 during an initial alignment phase of the automated hitching process described herein. Upon initiation (step 312) and system 10 activation (step 314) as generally discussed above with respect to FIG. 13, the system 10 can determine if an identified trailer 16 corresponds with a trailer profile stored in memory or if the trailer is a new trailer (step 316). As discussed above, this can be done by prompting for, and receiving a user indication of whether the trailer is new or has a profile stored in memory 62 or using the image processing routine 64. If the target trailer 16 corresponds with a stored profile, system 10 can facilitate user selection of the particular trailer profile (step 318) and can load a previously-generated trailer-type indicator 100, such as the trailer depiction presented in graphic target 45, discussed above and shown in FIGS. 7, 9A, and 9B. If the target trailer 16 does not have a stored profile, the controller 26 causes a standard target graphic 45 to be displayed (step 320) until a target trailer 16 is located (step 322). When a target trailer 16 is located, controller 26 uses the image processing routine 64, for example, to identify the shape of the trailer or significant shape features thereof (step 324) and, in the present embodiment, selects a best-matched trailer depiction from a selection of the same stored in memory 62 to present as the trailer type indicator 100 and displays the selected image in connection with the graphical target 45, as discussed above.

Figure 15:
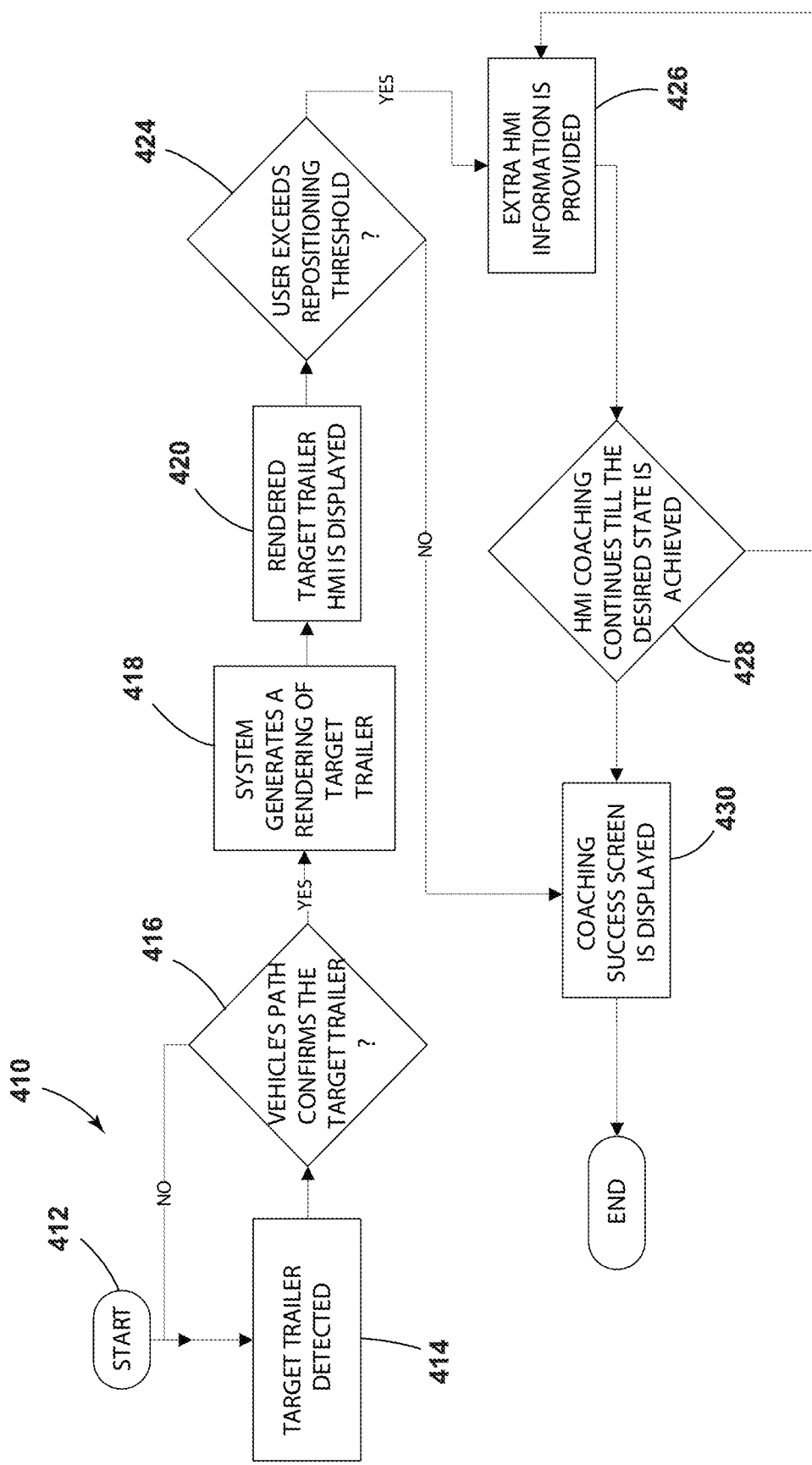
FIG. 15 is a flowchart depicting steps executable by a system for presenting a graphical instruction to assist a user in aligning a vehicle with respect to a trailer prior to initiation of an automated hitching maneuver.

Turning to FIG. 15, a further method used in connection with executing an automated hitching maneuver using aspects of the system 10, as described above, is shown. Again, it is to be appreciated that the method 410 can be stored in memory 62 and executed by the controller 26, discussed above, or may be implemented by other devices with appropriate configuration and/or programming. As shown, the method reflects a process for detecting user difficulty in aligning the vehicle 12 with respect to the trailer 16, as required for initiation of an automated hitching maneuver, as described herein. Upon initiation (step 412) and system 10 activation, as generally discussed above with respect to FIG. 13, the system 10 uses the image processing routine 64 to detect potential target trailer(s) 16 in the image data 55 (step 414) and determines that any detected trailers 16 are an intended target trailer 16 by comparing the detected trailer(s) 16 with the current vehicle 12 path (step 416). When the actual target trailer 16 is identified, the system 10 can generate a depiction of the trailer 16 (step 418), as discussed above, for use as the trailer type indicator 100 that can be displayed on the vehicle HMI 40, such as within the target graphic 45, as discussed above (step 420). The controller 26 can then monitor for behavior indicating difficulty in aligning the vehicle 12 with the trailer, according to the various criteria discussed above (including depending on the particular trailer type) in step 422. When one or a combination of threshold criteria are met, the controller 26 can present an instruction graphic 106 (FIG. 10) on the vehicle HMI 40 until the particular desired alignment is achieved (step 424), at which point, proper alignment is indicated (step 426).

Figure 16:
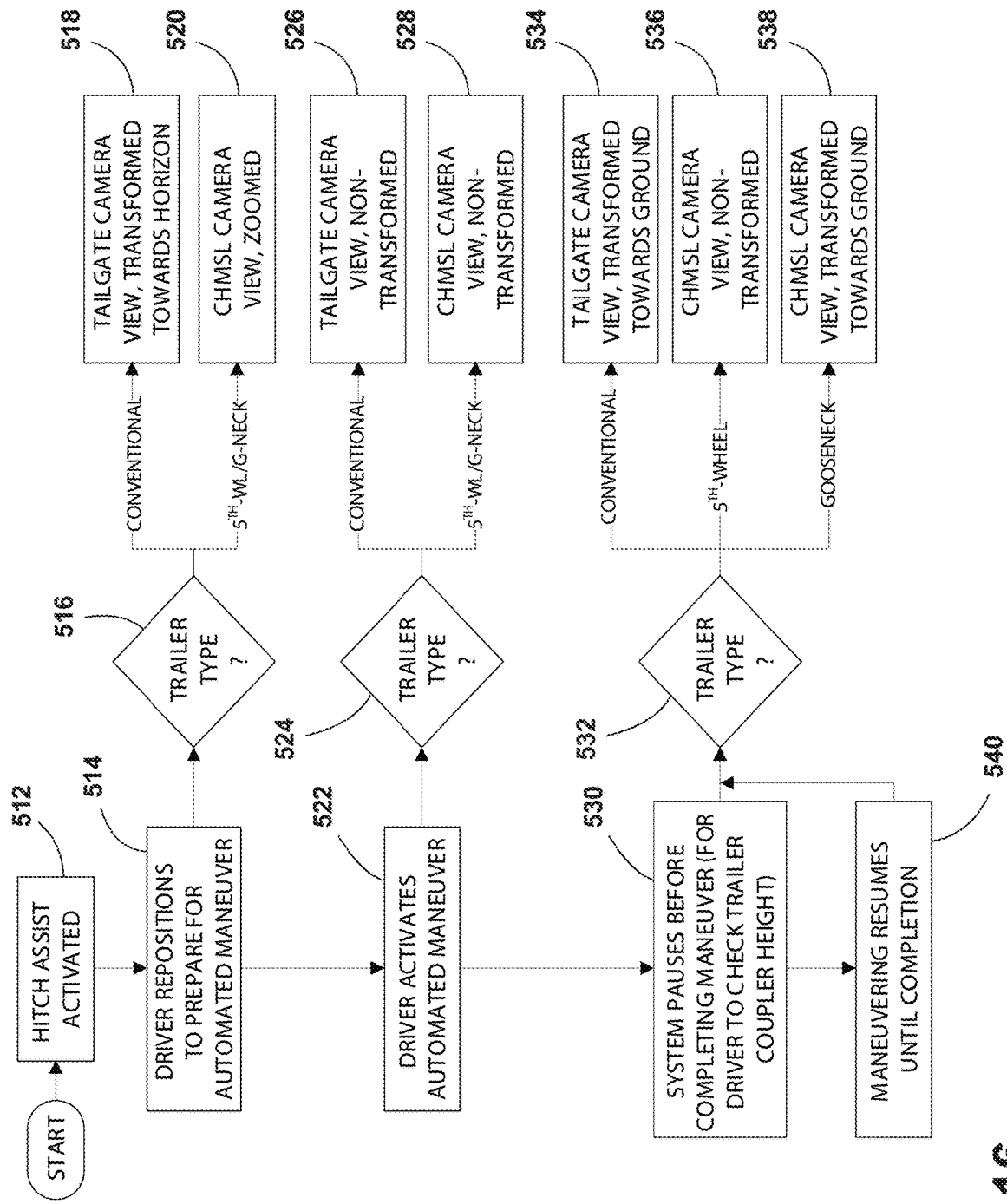
FIG. 16 is a flowchart depicting steps executable by a system for presenting specific camera views at various stages during a hitching maneuver and corresponding with an identified target trailer type.

As shown in FIG. 16, the system 10 can be configured to present various portions of the image data 55 on the vehicle HMI 40 during various stages of an automated hitching process, depending on the particular state and the type of trailer 16 detected. In particular, after system activation (step 512), the driver positions the vehicle 12 for proper initial alignment with the trailer 16, as discussed above (step 514) while the controller 26 looks for and identifies the type of a target trailer 16 (step 516). If the trailer is a conventional trailer the controller 26 can present (or continue presenting) image data 55 from the rear camera 48 on the HMI 40 (step 518). If a fifth-wheel or gooseneck type trailer 16 is detected, a zoomed or scaled view (FIG. 8, e.g.) of image data 55 from the CHMSL camera 50 can be presented. After successful initial alignment is achieved, the user can initiate automated vehicle 12 control in executing the operating routine 68 to back the vehicle 12 into final alignment with the target trailer 16 (step 520). If the trailer type (step 522) is a conventional trailer 16, the view can remain a non-transformed view of the image data 55 from the rear camera 48 (step 524). For a fifth wheel or gooseneck type trailer 16, the view can be presented from the CHMSL camera 50 in a non-transformed or non-zoomed manner to allow the user to visualize the receiver 90 as the vehicle advances toward the kingpin 88 of the trailer 16. In one aspect, the system 10 can pause at a predetermined point during the automated backing maneuver (step 526) for the user to check and/or confirm that the coupling feature 14 is at an appropriate height. In connection with this stage, the system can present different views depending on the detected trailer 16 type (step 528), including presenting (step 530) a view of the rear camera 48 image data 55 that is cropped and zoomed toward the ground (i.e., the location of the cup 47 and hitch ball 37 (step 532). For a fifth-wheel trailer 16, the a non-translated view of the CHMSL camera 50 data can be presented (step 534), and for a gooseneck trailer, the view from the CHMSL camera 50 can be zoomed and/or cropped downward to maintain the view of the receiver 90 and kingpin 88, while focusing the view on the gooseneck and lower trailer 16. The view selected in step 532 can be maintained through final alignment and the end of the process.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for assisting in aligning a vehicle for hitching with a trailer, comprising:
    an imaging system including a first camera and a second camera capturing image data of an area to the rear of the vehicle and outputting the image data; and
    a controller:
        identifying at least one of the trailer or a coupling feature of the trailer within the image data;
        assigning a trailer type to the trailer identified within the image data, the trailer type including a first trailer type and a second trailer type;
        causing a portion of the image data to be presented on a display within the vehicle, the portion of the image data corresponding with the first camera in response to the trailer being assigned the first trailer type and corresponding with the second camera in response to the trailer being assigned the second trailer type;
        presenting a target image over the portion of the image data presented on the display, the target image being smaller than a field of view associated with the portion of the image data and corresponding with a target position area relative to the vehicle; and
        determining that the at least one of the coupling feature and the trailer is within the target position are and outputting a steering signal to the vehicle to cause the vehicle to steer to align a hitch of the vehicle with the coupling feature.

2. The system of claim 1, wherein:
the vehicle defines a rear portion and a cabin having a rear edge forward of the rear portion of the vehicle;
the first camera is mounted on the rear portion of the vehicle; and
the second camera is mounted adjacent the rear edge of the cabin.

3. The system of claim 2, wherein:
the vehicle is a pickup truck;
the rear portion of the vehicle includes a tailgate of the pickup truck, the tailgate enclosing an end of a bed of the pickup truck; and
the rear edge of the cabin is defined above a rear cab window of the pickup truck such that the field of view associated with the portion of the image data corresponding with the second camera includes at least a portion of the bed of the pickup truck.

4. The system of claim 1, wherein:
the first trailer type is a conventional trailer configured for coupling with the vehicle at a hitch ball disposed on a rear of the vehicle; and
the second trailer type is a fifth-wheel trailer configured for coupling with the vehicle at a kingpin disposed over a rear axle of the vehicle.

5. The system of claim 4, wherein:
the target image is presented to include a depiction of a conventional trailer when the assigned trailer type is the conventional trailer; and
the target image is presented to include a depiction of a fifth-wheel trailer when the assigned trailer type is the fifth-wheel trailer.

6. The system of claim 4, wherein:
when the assigned trailer type is the fifth-wheel trailer, the controller further configures the target position area to be disposed from a front of the trailer; and
the controller further outputs an instruction for movement of the vehicle determined to position the one of the trailer or the coupling feature within the target position area.

7. The system of claim 1, wherein causing the portion of the image data corresponding with the second camera to be presented on the display within the vehicle includes applying a digital scaling function to the portion of the image data.

8. A system for assisting in aligning a vehicle for hitching with a trailer, comprising:
    an imaging system capturing image data of an area to the rear of the vehicle and outputting the image data; and
    a controller:
        causing a portion of the image data to be presented on a display within the vehicle;
        identifying at least one of the trailer or a coupling feature of the trailer within the image data and assigning a trailer type to the trailer identified within the image data, the trailer type including a first trailer type and a second trailer type;
        presenting a target image over the portion of the image data presented on the display, the target image being smaller than a field of view associated with the portion of the image data, corresponding with a target position area relative to the vehicle, and including a depiction of the trailer type; and
        determining that the at least one of the coupling feature and the trailer is within the target position area and outputting a steering signal to the vehicle to cause the vehicle to steer to align a hitch of the vehicle with the coupling feature.

9. The system of claim 8, wherein:
the first trailer type is a conventional trailer configured for coupling with the vehicle at a hitch disposed on a rear of the vehicle; and the second trailer type is a fifth-wheel trailer configured for coupling with the vehicle at a kingpin disposed over a rear axle of the vehicle.

10. The system of claim 9, wherein:
the target image is presented to include a depiction of a conventional trailer when the assigned trailer type is the conventional trailer; and
the target image is presented to include a depiction of a fifth-wheel trailer when the assigned trailer type is the fifth-wheel trailer.

11. The system of claim 8, wherein:
the controller further develops a three-dimensional rendered scene of the area to the rear of the vehicle using the image data; and
the trailer type is assigned to the trailer identified within the image data using the three-dimensional rendered scene.

12. The system of claim 8, wherein:
the imaging system includes a first camera and a second camera; and
the portion of the image data presented on the display corresponds with the first camera in response to the trailer being assigned the first trailer type and corresponds with the second camera in response to the trailer being assigned the second trailer type.

13. The system of claim 12, wherein:
the vehicle is a pickup truck;
the vehicle defines a rear portion, including a tailgate enclosing an end of a bed of the pickup truck, and a cabin having a rear edge forward of the rear portion of the vehicle;
the first camera is mounted on the rear portion of the vehicle; and
the second camera is mounted adjacent the rear edge of the cabin, the rear edge of the cabin being defined above a rear cab window of the pickup truck such that the field of view associated with the portion of the image data corresponding with the second camera includes at least a portion of the bed of the pickup truck.

14. The system of claim 8, wherein:
when the assigned trailer type is the second trailer type, the controller further configures the target position area to be disposed from a front of the trailer; and
the controller further outputs an instruction for movement of the vehicle determined to position the one of the trailer or the coupling feature within the target position area.

15. A system for assisting in aligning a vehicle for hitching with a trailer, comprising:
an imaging system outputting image data of a field of view directed rearward from the vehicle, the imaging system including a first camera and a second camera; and
a controller:
identifying at least one of the trailer or a coupling feature of the trailer within the image data;
assigning a trailer type to the trailer identified within the image data, the trailer type including a first trailer type and a second trailer type;
causing a portion of the image data to be presented on a display within the vehicle, the portion of the image data corresponding with the first camera in response to the trailer being assigned the first trailer type and corresponding with the second camera in response to the trailer being assigned the second trailer type;
determining that the at least one of the trailer or the coupling feature is outside of a target position area relative to the vehicle and outputting an instruction for movement of the vehicle determined to position the one of the trailer or the coupling feature within the target position area in response to identifying at least one indication of a user difficulty in positioning the one of the trailer or the coupling feature within the target position area; and
determining that the at least one of the coupling feature and the trailer is within the target position area and outputting a steering signal to the vehicle to cause the vehicle to steer to align a hitch of the vehicle with the coupling feature.

16. The system of claim 15, wherein the at least one indication of user difficulty in positioning the one of the trailer or the coupling feature within the target position area includes at least one of:
a number of changes in a state of a vehicle gear selector passing a predetermined gear change threshold;
a distance traveled while the controller determines that the at least one of the trailer or the coupling feature is outside of the target position area exceeds a predefined distance threshold; or
a time elapsed while the controller determines that the at least one of the trailer or the coupling feature is outside of the target position area exceeding a predefined time threshold.

17. The system of claim 15, wherein the instruction for movement of the vehicle determined to position the one of the trailer or the coupling feature within the target position area includes an overhead depiction of the vehicle relative to the trailer and a heading indication of the trailer, presented on a display within the vehicle.

18. The system of claim 15, wherein:
the vehicle is a pickup truck;
the vehicle defines a rear portion, including a tailgate enclosing an end of a bed of the pickup truck, and a cabin having a rear edge forward of the rear portion of the vehicle;
the first camera is mounted on the rear portion of the vehicle; and
the second camera is mounted adjacent the rear edge of the cabin, the rear edge of the cabin being defined above a rear cab window of the pickup truck such that the field of view associated with the portion of the image data corresponding with the second camera includes at least a portion of the bed of the pickup truck.

19. The system of claim 15, wherein the controller further:
causes a portion of the image data to be presented on a display within the vehicle;
identifies at least one of the trailer or the coupling feature of the trailer within the image data and assigns a trailer type to the trailer identified within the image data, the trailer type including a first trailer type and a second trailer type; and
presents a target image over the portion of the image data presented on the display, the target image being smaller than the field of view associated with the portion of the image data, corresponding with the target position area relative to the vehicle, and including a depiction of the trailer type.

* * * * *